United States Patent [19]
Hayashi et al.

[11] Patent Number: 5,974,171
[45] Date of Patent: *Oct. 26, 1999

[54] IMAGE PROCESSING APPARATUS AND METHOD

[75] Inventors: Toshio Hayashi, Kawasaki; Kiyohisa Sugishima, Yokohama; Masayuki Hirose, Kawasaki; Shigeo Yamagata, Yokohama; Fumio Mikami, Chigasaki; Eiichi Motoyama, Tokyo; Koji Arai, Kawaguchi; Takashi Nonaka, Yokohama; Kenji Hara, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/517,824

[22] Filed: Aug. 22, 1995

[30] Foreign Application Priority Data

Aug. 26, 1994 [JP] Japan ................................. 6-225821

[51] Int. Cl.$^6$ ..................................................... G06K 9/00
[52] U.S. Cl. ........................................... 382/162; 382/165
[58] Field of Search ..................... 382/164, 165, 382/101, 102, 282, 306, 162; 358/452, 453, 517, 538

[56] References Cited

U.S. PATENT DOCUMENTS

| | | | |
|---|---|---|---|
| 4,956,676 | 9/1990 | Fukae et al. | 399/302 |
| 5,300,952 | 4/1994 | Wada et al. | 347/217 |
| 5,414,974 | 5/1995 | Van de Ven et al. | 53/399 |
| 5,436,735 | 7/1995 | Tanabe et al. | 358/452 |
| 5,437,441 | 8/1995 | Tuhro et al. | 382/101 |
| 5,548,663 | 8/1996 | Sekine et al. | 382/167 |
| 5,552,900 | 9/1996 | Someya | 358/452 |

*Primary Examiner*—Yon J. Couso
*Attorney, Agent, or Firm*—Fitzpatrick, Cella, Harper & Scinto

[57] ABSTRACT

An image processing apparatus prevents the misdetermination of a read color and allows correct marker edition. A marker registration circuit reads and register color data marked by a predetermined color marker and a color determination circuit compares the color data registered and the read color data at the reading of the document sheet to determine a color code of the marker color. An area determination circuit determines whether an area being read belongs to a normal area, a line area or a paint area and an output color determination circuit determines a color to be outputted in accordance with the color code and the area being read.

72 Claims, 47 Drawing Sheets

FIG. 4

| Type | Rmax | Gmax | Bmax | PROCESSING |
|---|---|---|---|---|
| 1 | 0 | 0 | 0 | CALCULATE RATIO WHEN COLOR INDICATING SECOND LARGEST VALUE IS 20h |
| 2 | 0 | 0 | 1 | CALCULATE RATIO WHEN SIGNAL B IS 20h |
| 3 | 0 | 1 | 0 | CALCULATE RATIO WHEN SIGNAL G IS 20h |
| 4 | 1 | 0 | 0 | CALCULATE RATIO WHEN SIGNAL R IS 20h |
| 5 | 0 | 1 | 1 | CALCULATE RATIO WHEN SIGNAL G AND SIGNAL B ARE 20h |
| 6 | 1 | 0 | 1 | CALCULATE RATIO WHEN SIGNAL R AND SIGNAL B ARE 20h |
| 7 | 1 | 1 | 0 | CALCULATE RATIO WHEN SIGNAL R AND SIGNAL G ARE 20h |
| 8 | 1 | 1 | 1 | OUTPUT RATIO DATA R = G = B = 3F (WHITE CODE) |

FIG. 9

| | MARKER EDITING BASIC FUNCTION | |
|---|---|---|
| ORIGINAL | COLORING | OUTPUT |
| FOR PAINTING | | |
| FOR COLOR CONVERSION | | |
| FOR BOTH | | |

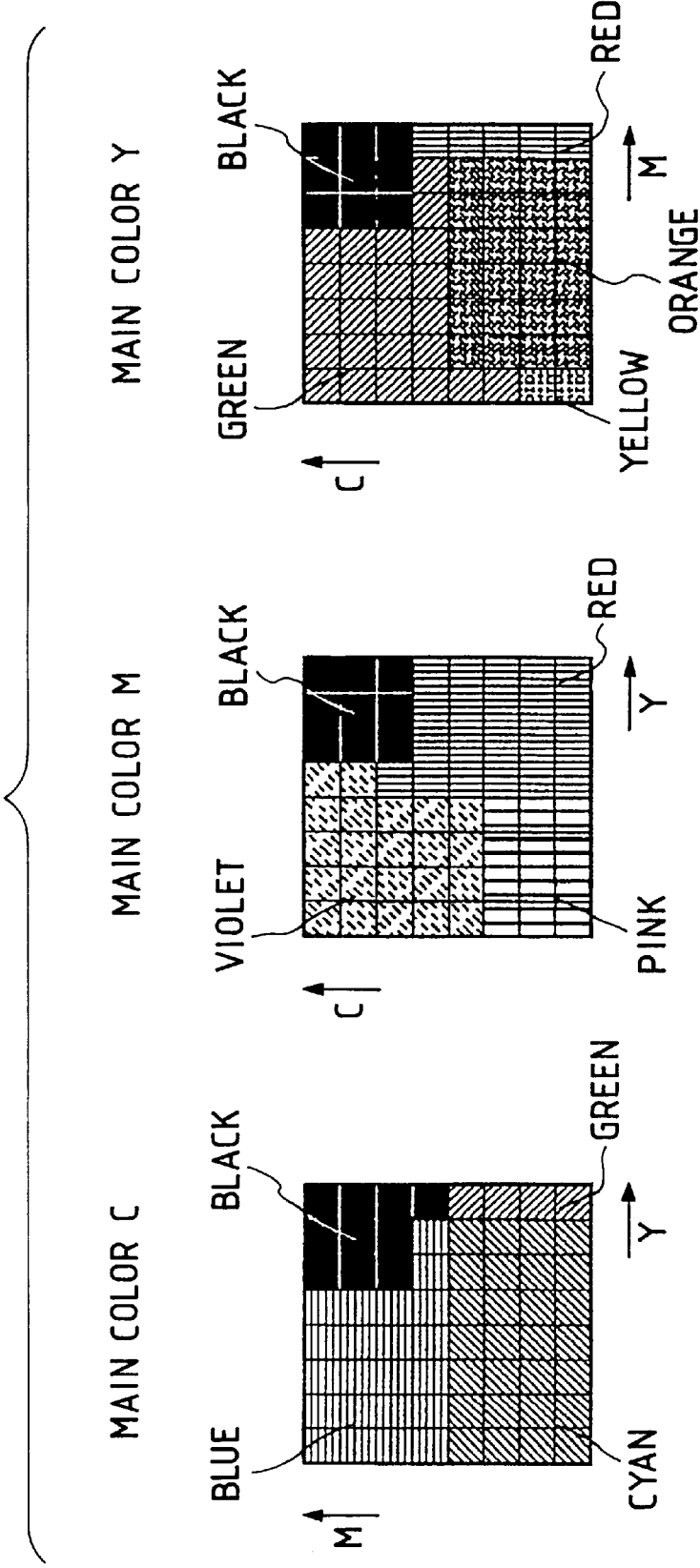

COLOR CODE TABLE

| COLOR CODE | MARKER COLOR |
|---|---|
| 0 | WHITE |
| 1 | CYAN |
| 2 | PINK |
| 3 | YELLOW |
| 4 | GREEN |
| 5 | ORANGE |
| 6 | VIOLET |
| 7 | RED |
| 8 | BLUE |
| 9 | BLACK |

FIG. 16

| FIG. 16A | FIG. 16B | FIG. 16C |

FIG. 16A

| DELAY | | | | | | |
|---|---|---|---|---|---|---|
| PAINT DECISION COLOR | LINE DECISION COLOR | AREA MODE | HORIZONTAL COUNTER | | | |
| | | | BLACK | | COLOR AND WHITE | |
| PAINT OUT | LINE OUT | AREA OUT | YBK 1 | YBK 2 | YIRO WHH 1 | YIRO WHH 2 |
| | | NORMAL (0) | NOT FULL | | | |
| | | | FULL | | | |

YBK1, TTBKH1:CLEAR BY BLACK (GAP PIXEL NUMBER COMPARATOR)

YBK2, TTBKH2:CLEAR BY BLACK (STUCK OUT PIXEL NUMBER COMPARATOR)

DISTANCE COUNTER BOTH IN COLOR AND WHITE CHANGES CLEAR CONDITIONS IN ACCORDANCE WITH AREA BOTH IN HORIZONTAL AND VERTICAL DIRECTIONS

NORMAL:CLEAR BY WHITE

PAINTING:MERELY CLEAR BY COLOR OR CLEAR BY PAINT DECISION COLOR CAN BE SWITCHED

OTHERWISE:NO CLEAR

FIG. 16B

| VERTICAL COUNTER | | | DELAY | INPUT DATA | |
|---|---|---|---|---|---|
| BLACK | | COLOR | WHITE | PRECEDING COLOR | CURRENT COLOR |
| TTB KH1 | TTB KH2 | TTIR OH | TTW HH | MAE IRO OUT | CN16 |
| NOT FULL | | | | /////WHITE///// | WHITE |
| | | | | | BLACK |
| | | | | | COLOR |
| FULL | | | | | |
| | | | | /////BLACK///// | WHITE |
| | | | | | BLACK |
| | | | | | COLOR |
| | | | | /////COLOR///// | WHITE |
| | | | | | BLACK |
| | | | | | COLOR |

YIROWHH1: (GAP PIXEL NUMBER COMPARATOR)

YIROWHH2: (STUCK OUT PIXEL NUMBER COMPARATOR)

*1: RESPECTIVE COUNTERS FOR BLACK, COLOR AND WHITE ALWAYS ARE SET TO 1 (FULL) IN LINE EXCLUSIVE MODE

*2: NO SMEARED IMAGE TRAILING EDGE PROCESSING

*3: EFFECTIVE ONLY UPON PAINT EXCLUSIVE USE

*4: BOTH OF TTBKH1 AND TTBKH2 CAN BE SELECTED

FIG. 16C

| DETERMINATION | | PROCESSING AFTER DETERMINATION |
|---|---|---|
| AREA MODE | PRINT COLOR | COLOR SET PROCESSING |
| AREA IN | INJI IRO | PAINTIN, LINEIN MAEIROIN |
| NORMAL | WHITE | |
| NORMAL | BLACK | |
| PAINT | CURRENT COLOR | CN16→PAINTIN |
| PAINT | CURRENT COLOR | CN16→PAINTIN |
| LINE | WHITE | CN16→LINEIN |
| PAINT | CURRENT COLOR | CN16→PAINTIN *3(PAINT EXCLUSIVE USE 1) |
| NORMAL | WHITE | *3(PAINT EXCLUSIVE USE 2) |
| NORMAL | WHITE | |
| NORMAL | BLACK | |
| PAINT | CURRENT COLOR | CN16→PAINTIN |
| LINE | WHITE | CN16→LINEIN(*1) |
| NORMAL | WHITE | |
| NORMAL | BLACK | *3(PAINT EXCLUSIVE USE 2) |
| NORMAL | WHITE | |

FIG. 17

| FIG. 17A | FIG. 17B | FIG. 17C |

FIG. 17A

| DELAY | | | | | | |
|---|---|---|---|---|---|---|
| PAINT DECISION COLOR | LINE DECISION COLOR | AREA MODE | HORIZONTAL COUNTER | | | |
| | | | BLACK | | COLOR AND WHITE | |
| PAINT OUT | LINE OUT | AREA OUT | YBK 1 | YBK 2 | YIRO WHH 1 | YIRO WHH 2 |
| | | PAINT (1) | | FULL / NOT FULL / FULL | FULL / NOT FULL | NOT FULL |

FIG. 17B

| VERTICAL COUNTER | | | | DELAY | INPUT DATA | |
|---|---|---|---|---|---|---|
| BLACK | | COLOR | WHITE | PRECEDING COLOR | CURRENT COLOR | |
| TTB KH1 | TTB KH2 | TTIR OH | TTW HH | MAE IRO OUT | CN16 | |
| | | FULL / NOT FULL | | WHITE | WHITE | |
| | | | | | BLACK | |
| | | | | | COLOR | CURRENT COLOR = PAINTOUT |
| | | | | | | CURRENT COLOR ≠ PAINTOUT |
| | | | | BLACK | WHITE | |
| | | | | | BLACK | |
| | | | | | COLOR | |
| NOT FULL | *4 | | | COLOR | WHITE | |
| FULL | *4 | | | | BLACK | |
| | | | | | COLOR | CURRENT COLOR = PAINTOUT |
| | | | | | | CURRENT COLOR ≠ PAINTOUT |

FIG. 17C

| DETERMINATION | | PROCESSING AFTER DETERMINATION |
|---|---|---|
| AREA MODE | PRINT COLOR | COLOR SET PROCESSING |
| AREA IN | INJI IRO | PAINTIN, LINEIN MAEIROIN |
| PAINT | PAINTOUT | |
| NORMAL | BLACK | |
| NORMAL | BLACK | |
| PAINT | BLACK | |
| PAINT | PAINTOUT | |
| LINE IN PAINT | PAINTOUT | CN16→LINEIN |
| PAINT | PAINTOUT | |
| PAINT | BLACK | |
| PAINT | PAINTOUT | |
| NORMAL | WHITE | |
| PAINT | PAINTOUT | MAEIROOUT→MAEIROIN (SMEARED IMAGE TRAILING EDGE PROCESSING) |
| PAINT | PAINTOUT | *2 |
| NORMAL | WHITE | *2 |
| NORMAL | WHITE | (STICKING OUT PROCESSING) |
| PAINT | PAINTOUT | |
| NORMAL | BLACK | |
| PAINT | CURRENT COLOR | |
| LINE IN PAINT | PAINTOUT | CN16→LINEIN |

FIG. 18

| FIG. 18A | FIG. 18B | FIG. 18C |

FIG. 18A

| DELAY |||||||
|---|---|---|---|---|---|---|
| PAINT DECISION COLOR | LINE DECISION COLOR | AREA MODE | HORIZONTAL COUNTER ||||
| ||| BLACK || COLOR AND WHITE ||
| PAINT OUT | LINE OUT | AREA OUT | YBK 1 | YBK 2 | YIRO WHH 1 | YIRO WHH 2 |
| | | LINE (2) | | | | NOT FULL / FULL |

YBK1: CLEAR BY BLACK (GAP PIXEL NUMBER COMPARATOR)

YBK2: CLEAR BY BLACK (STUCK OUT PIXEL NUMBER COMPARATOR)

DISTANCE COUNTER BOTH IN COLOR AND WHITE CHANGES CLEAR CONDITIONS IN ACCORDANCE WITH AREA BOTH IN HORIZONTAL AND VERTICAL DIRECTIONS

NORMAL: CLEAR BY WHITE

PAINTING: MERELY CLEAR BY COLOR OR CLEAR BY PAINT DECISION COLOR CAN BE SWITCHED

OTHERWISE: NO CLEAR

FIG. 18B

| VERTICAL COUNTER | | | DELAY | INPUT DATA |
|---|---|---|---|---|
| BLACK | COLOR | WHITE | PRECEDING COLOR | CURRENT COLOR |
| TTB KH1 | TTB KH2 | TTIR OH | TTW HH | MAE IRO OUT | CN16 |
| | | | | WHITE | WHITE, BLACK, COLOR |
| | | | | | WHITE |
| | | | | BLACK | BLACK |
| | | | | | COLOR |
| | | | | | WHITE |
| | | | NOT FULL | COLOR | BLACK |
| | | | FULL | | |
| | | | | | COLOR |

YIROWHH1:(GAP PIXEL NUMBER COMPARATOR)

YIROWHH2:(STUCK OUT PIXEL NUMBER COMPARATOR)

*1:RESPECTIVE COUNTERS FOR BLACK, COLOR AND WHITE ALWAYS ARE SET TO 1 (FULL) IN LINE EXCLUSIVE MODE

*5:TWO TYPES OF END CONDITIONS IN LINE AREA IN PAINT CAN BE SWITCHED

FIG. 18C

| DETERMINATION | | PROCESSING AFTER DETERMINATION |
|---|---|---|
| AREA MODE | PRINT COLOR | COLOR SET PROCESSING |
| AREA IN | INJI IRO | PAINTIN, LINEIN MAEIROIN |
| NORMAL | WHITE | |
| LINE | LINEOUT | |
| LINE | WHITE | |
| NORMAL | WHITE | |
| NORMAL | BLACK | (STICKING OUT PROCESSING) |
| NORMAL | BLACK | (STICKING OUT PROCESSING) |
| LINE | LINEOUT | |
| LINE | WHITE | CN16→LINEIN |

FIG. 19

| FIG. 19A | FIG. 19B | FIG. 19C |

FIG. 19A

| DELAY |||||||
|---|---|---|---|---|---|---|
| PAINT DECISION COLOR | LINE DECISION COLOR | AREA MODE | HORIZONTAL COUNTER ||||
| ^ | ^ | ^ | BLACK || COLOR AND WHITE ||
| PAINT OUT | LINE OUT | AREA OUT | YBK 1 | YBK 2 | YIRO WHH 1 | YIRO WHH 2 |
| | | LINE IN PAINT (3) | | NOT FULL / FULL | | |

FIG. 19B

| VERTICAL COUNTER | | | | DELAY | INPUT DATA |
|---|---|---|---|---|---|
| BLACK | | COLOR | WHITE | PRECEDING COLOR | CURRENT COLOR |
| TTB KH1 | TTB KH2 | TTIR OH | TTW HH | MAE IRO OUT | CN16 |
| | | | | WHITE | WHITE, BLACK, COLOR |
| | | | | BLACK | WHITE |
| | | | | | BLACK |
| | | | | | COLOR |
| | NOT FULL | | | COLOR | WHITE |
| | FULL | | | | BLACK |
| | | | | | COLOR: CURRENT COLOR = PAINTOUT |
| | | | | | COLOR: CURRENT COLOR ≠ PAINTOUT |

FIG. 19C

| DETERMINATION | | PROCESSING AFTER DETERMINATION |
|---|---|---|
| AREA MODE | PRINT COLOR | COLOR SET PROCESSING |
| AREA IN | INJI IRO | PAINTIN, LINEIN MAEIROIN |
| ✗✗✗ | ✗✗✗ | ✗✗✗ |
| NORMAL PAINT | WHITE PAINTOUT | *5 |
| LINE IN PAINT | LINEOUT | |
| LINE IN PAINT | PAINTOUT | |
| NORMAL PAINT | WHITE PAINTOUT | *5 |
| NORMAL PAINT | WHITE PAINTOUT | *5 |
| PAINT | PAINTOUT | |
| LINE IN PAINT | LINEOUT | |
| PAINT | PAINTOUT | |
| LINE IN PAINT | PAINTOUT | CN16→LINEIN |

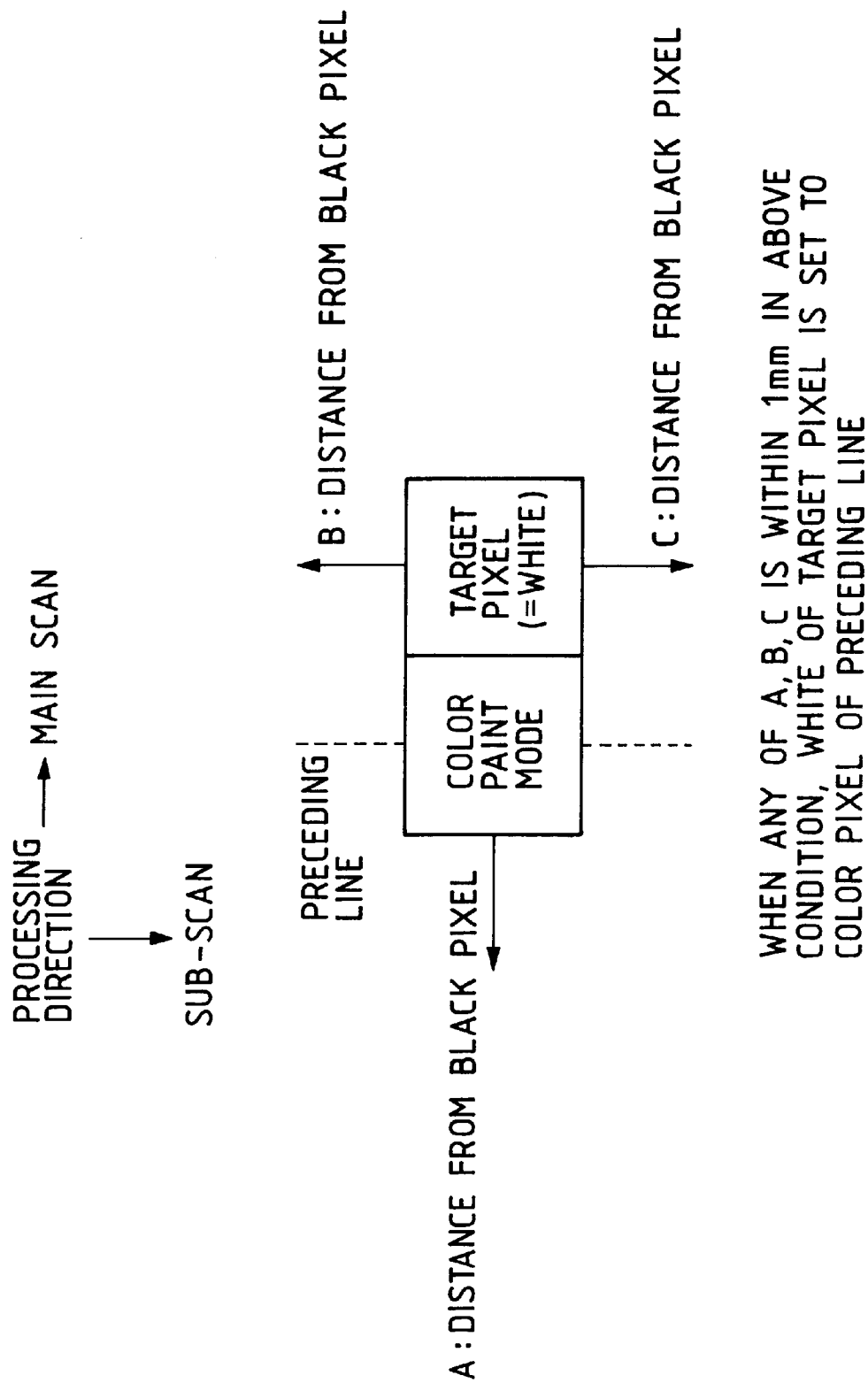

OUTPUT COLOR TABLE

| COLOR CODE | MARKER COLOR | C | M | Y | K |
|---|---|---|---|---|---|
| 0 | WHITE | 0 | 0 | 0 | 0 |
| 1 | CYAN | 70 | 20 | 0 | 0 |
| 2 | PINK | 0 | 80 | 20 | 0 |
| 3 | YELLOW | 0 | 0 | 80 | 0 |
| 4 | GREEN | 50 | 0 | 70 | 0 |
| 5 | ORANGE | 0 | 40 | 100 | 0 |
| 6 | VIOLET | 40 | 80 | 0 | 0 |
| 7 | RED | 0 | 100 | 80 | 0 |
| 8 | BLUE | 100 | 80 | 20 | 0 |
| 9 | BLACK | 0 | 0 | 0 | 140 |
|  | BLUEBACK | 200 | 100 | 0 | 0 |

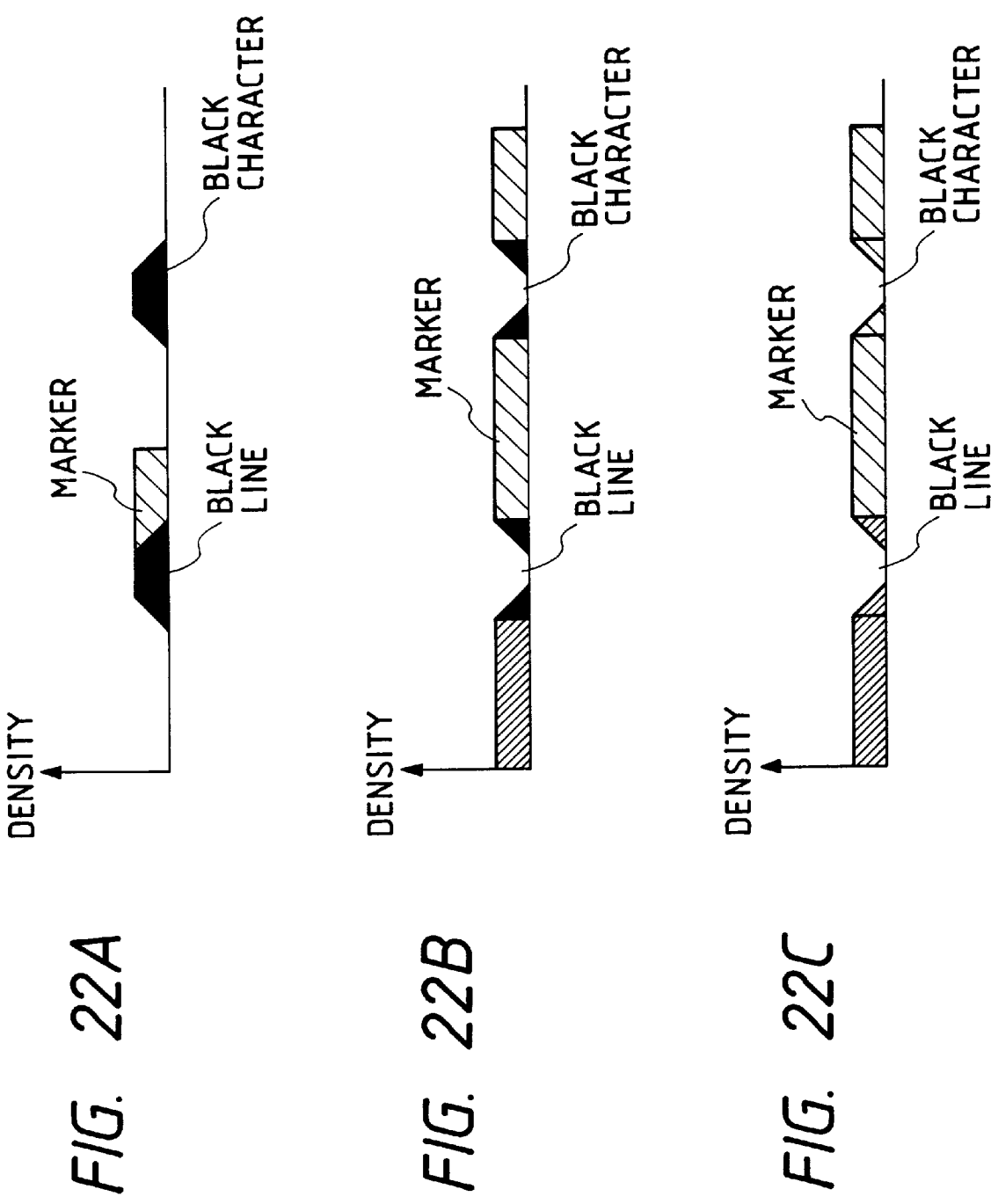

FIG. 23

| PRINT DECISION COLOR \ BACK | | STANDARD BACK | STANDARD BLUEBACK | BLACK AS IT IS AND BLUEBACK IN PAINT AREA |
|---|---|---|---|---|
| WHITE | | WHITE TABLE | BLUEBACK TABLE | BLUEBACK TABLE |
| BLACK | PRINT | DENSITY × A | PAINT COLOR TABLE × REVERSE DENSITY ÷ 128 | DENSITY × A |
| | OTHER | | BLUEBACK TABLE × REVERSE DENSITY ÷ 128 | BLUEBACK TABLE × REVERSE DENSITY ÷ 128 |
| COLOR | PAINT | RESPECTIVE COLOR TABLE | RESPECTIVE COLOR TABLE | RESPECTIVE COLOR TABLE |
| | LINE | RESPECTIVE COLOR TABLE × DENSITY × B ÷ 128 | RESPECTIVE COLOR TABLE × DENSITY × B ÷ 128 | RESPECTIVE COLOR TABLE × DENSITY × B ÷ 128 |

"DENSITY"="MAGENTA VALUE OF TARGET PIXEL" (4 BIT DEGENERATION)
"REVERSE DENSITY"="BLACK TABLE"-"MAGENTA VALUE OF TARGET PIXEL"×C

| FIG. 27A |
| FIG. 27B |
| FIG. 27C |

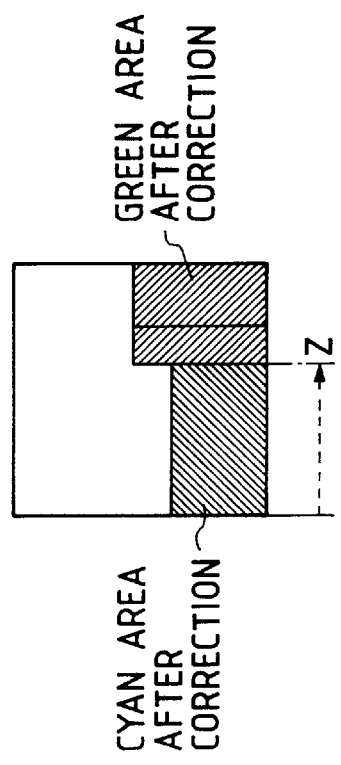
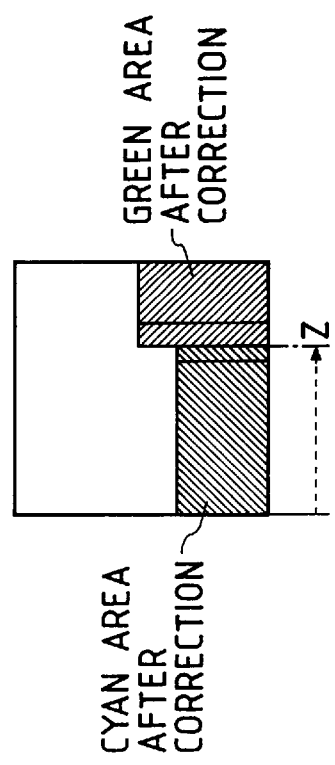
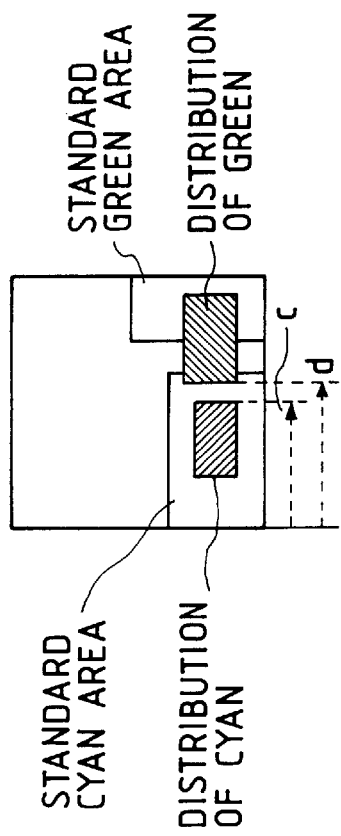
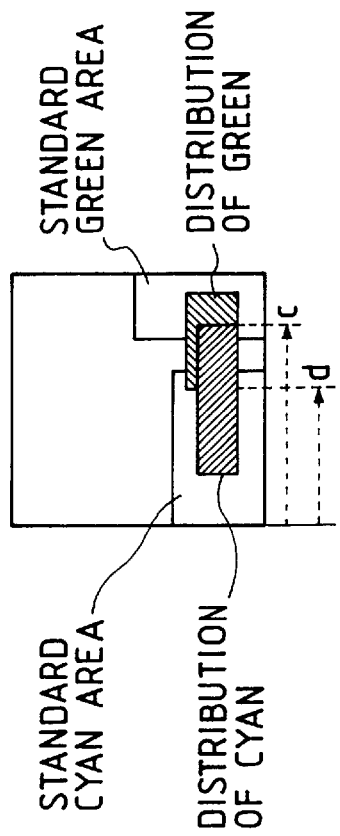

FIG. 31

|  | ENLARGEMENT | REDUCTION |
|---|---|---|
| (1) JAPAN | | |
| COMBINATION 1 | A4 → B4 | A4 ← B4 |
| COMBINATION 2 | A4 → A3 | A4 ← A3 |
| COMBINATION 3 | B4 → A3 | B4 ← A3 |
| (2) THE UNITED STATES | | |
| COMBINATION 1 | LTR → LGL | LTR ← LGL |
| (3) THE UNITED STATES | | |
| COMBINATION 1 | A4 → A3 | A4 ← A3 |

STANDARD

MAIN COLOR Y

MODIFICATION

MAIN COLOR Y

white, black, blue, white, … , white, blue, black, white.
IMAGE PROCESSING APPARATUS AND METHOD

BACKGROUND OF THE INVENTION

1. Field of the Invention

The present invention relates to an image processing apparatus such as a copying apparatus, and more particularly to an apparatus for effecting marker edition in accordance with information having a color marked by a color marker on a document sheet.

2. Related Background Art

In a color copying machine, a marker edition function to encircle or trace a desired area by a commercially available marker pen on a black-and-white document sheet to color the area has been proposed. Such a marker edition function usually has a plurality of modes such as a paint mode in which inside of a desired closed section 1000 defined by a black line on a document sheet having white underground is colored by a blue marker 1001 as shown in FIG. 37A so that an entire closed section is colored in blue for print-out as shown in FIG. 37B and a line mode in which a periphery of a desired black line 1002 on a document sheet having white underground is colored by a red marker 1003 as shown in FIG. 38B so that the black line is converted to a red line for print-out.

The determination of the paint mode shown in FIGS. 37A and 37B is first explained. During a read operation of an image of FIG. 37A, assuming that a read line at a given timing is a line A and an output sequence of pixel data is that shown by an arrow, color data is outputted in a sequence of . . . white, black, blue, white, . . . , white, blue, black, white. Accordingly, by detecting the presence of black immediately before first appeared blue, it is determined that the paint mode has been started from the first blue pixel. By detecting that black is immediately after the last blue, it is determined that the paint mode has been terminated with the last blue pixel. Accordingly, the paint mode is attained by outputting all pixels (blue, white, . . . white, blue) during the paint mode as blue data.

The determination of the line mode shown in FIGS. 38A and 38B is now explained. During a read operation of the image of FIG. 38A, assuming that a read line at a given timing is line B and an output sequence of image data is that shown by an arrow, the color data is outputted in a sequence of . . . , white, red, black, . . . black, red, white, . . . . Accordingly, by detecting the presence of white immediately before the first appeared red, it is determined that the line mode has been started from the first red pixel. By detecting that white is immediately after the last red, it is determined that the line mode has been terminated with the last red pixel. Accordingly, the line mode is attained by outputting the red pixels and the black pixels of the pixels (red, black, . . . , black, red) during the line mode as the white data and the red data, respectively.

In this manner, the starting mode is determined depending on whether the pixel immediately before the pixel for which the marker color is first detected is white or black, and when the starting mode is the paint mode, the mode is terminated when the pixel immediately after the pixel for which the marker color is lastly detected is black, and when the starting mode is the line mode, the mode is terminated when the pixel immediately after the pixel for which the marker color is lastly detected is white.

However, the color conversion mode is determined by the marker coloring by a user, and as shown in FIG. 39A, the user may desire the line mode process for a document sheet image 1004 but a color 1005 may appear by irregular painting during overpainting by the marker. Since the color 1005 is darker than a normally painted color 1006, the color 1005 and the color 1006 are determined as different colors and a resulting output is produced as shown in FIG. 39B.

The color of the sheet used for the document sheet is mainly white but because it may be slightly colored such as a recycled sheet, the color of the marker pen is not uniform or a characteristic of a color filter for reading the document sheet is not uniform, the read colors may be misdetermined and an output which is not intended by the user is resulted in.

The color of the marker differs from country to country even if it has the same label (for example, red). Further, the number of colors of the marker pens available in the market place is not uniform that is, five in one country and eight in other country. As a result, it is difficult to correctly recognize the colors of the color marking pens marketed worldwide and the misdetermination of the color occurs.

SUMMARY OF THE INVENTION

It is an object of the present invention to provide an image processing apparatus which solves the above problems.

It is another object of the present invention to provide an image processing apparatus which prevents the misdetermination of the read color and allows correct marker edition.

It is other object of the present invention to provide an image processing apparatus for effecting the marker edition which allows the registration of any marker color.

Other objects and features of the present invention will be apparent from the following description of the specification and the drawings.

BRIEF DESCRIPTION OF THE DRAWINGS

FIG. 4 illustrates a content of a process in a ratio calculation circuit of FIG. 3, FIGS. 5A and 5B show marker color distributions, FIG. 9 illustrates a content of the marker edition in a second embodiment of the present invention, FIG. 12 illustrates a method for determining color, FIG. 16 is comprised of FIGS. 16A to 16C showing tables for illustrating an area determination process, FIG. 17 is comprised of FIGS. 17A to 17C showing tables for illustrating the area determination process, FIG. 18 is comprised of FIGS. 18A to 18C showing tables for illustrating the area determination process, FIG. 19 is comprised of FIGS. 19A to 19C showing tables for illustrating the area determination process, FIG. 20 illustrates a tail process, FIGS. 22A to 22C illustrate a blue-back process, FIG. 23 shows a table for illustrating a color density determination condition, FIGS. 30A to 30H illustrate a color determination parameter correction process, FIG. 31 shows an example of setting of magnification.

DETAILED DESCRIPTION OF THE PREFERRED EMBODIMENTS

[First Embodiment]

Figure 1:
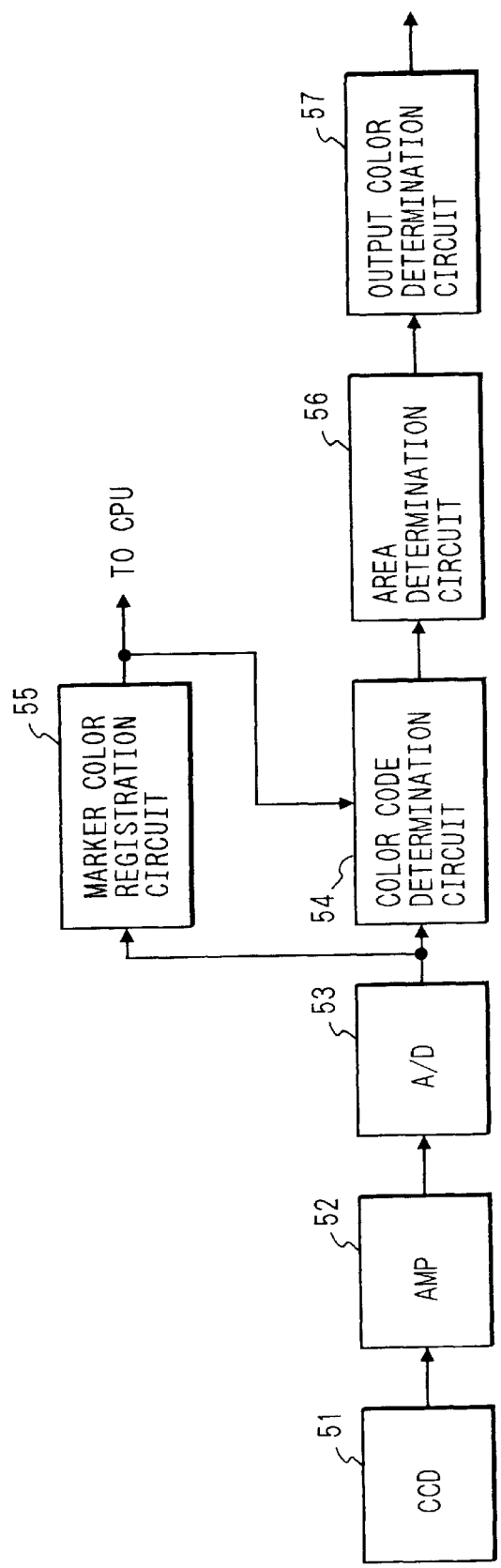
FIG. 1 shows a block diagram of a configuration of an image processing circuit in accordance with a first embodiment of the present invention.

FIG. 1 shows a block diagram of a configuration of a marker edition circuit in accordance with a first embodiment of the present invention. In FIG. 1, numeral 51 denotes a CCD sensor which color-decomposes an image signal read from a document sheet to RGB signals and outputs them to an analog amplifier 52. The analog amplifier 52 amplifies the input signal thereto with a predetermined gain (amplification factor). The amplified signal is supplied to an A/D converter 53 where the analog signal is converted to an 8-bit digital signal. A digital signal output of the A/D converter 53 is applied to a color code determination circuit 54 and a marker color registration circuit 55. The color code determination circuit 54 compares the input signal from the A/D converter 53 with the output signal of the marker color registration circuit 55 and converts the input signal to a 6-bit code signal representing the determined marker color. Namely, it converts the input color signal of 256×256×256=16777216 colors to a predetermined 64-color color code.

This is based on the premise that the colors which may be appear on a marker document sheet are limited to white, black and colors of markers available in the market place and it is intended to reduce a scale of a succeeding data processing circuit. Detailed operations of the color code determination circuit 54 and the marker color registration circuit 55 will be described in detail later.

An output signal of the color code determination circuit 54 is applied to an area determination circuit 56 which determines whether the area being read belongs to a normal area, a line area or a paint area (which will be described later). An output signal of the area determination circuit 56 is applied to an output color determination circuit 57 which determines an output color in accordance with the color code and the area mode and the data is converted to 8-bit image data in accordance with the determined color and supplied to the succeeding stage image processing circuit.

The determination of the two process modes, the paint mode and the line mode in the area determination circuit 56 is based on the following condition. (1) Paint mode: When the read color transits from "black" to "color" in a normal area, the mode is switched to the paint mode from the pixel for which the first "color" is read and the paint mode is continued until the transition of "color" to "black" is detected. When the transition of "color" to "black" is detected, the mode is returned to the normal mode. (2) Line mode: When the read color transits from "white" to "color" in the normal area, the mode is switched to the line mode from the pixel for which the first "color" is read and the line mode is continued until the transition of "color" to "white" is detected. When the transition of "color" to "white" is detected, the mode is returned to the normal mode.

In accordance with the above rule, the image signal having the marker processing applied thereto while the image on the document sheet is read is outputted from the marker edition circuit.

Figure 2:
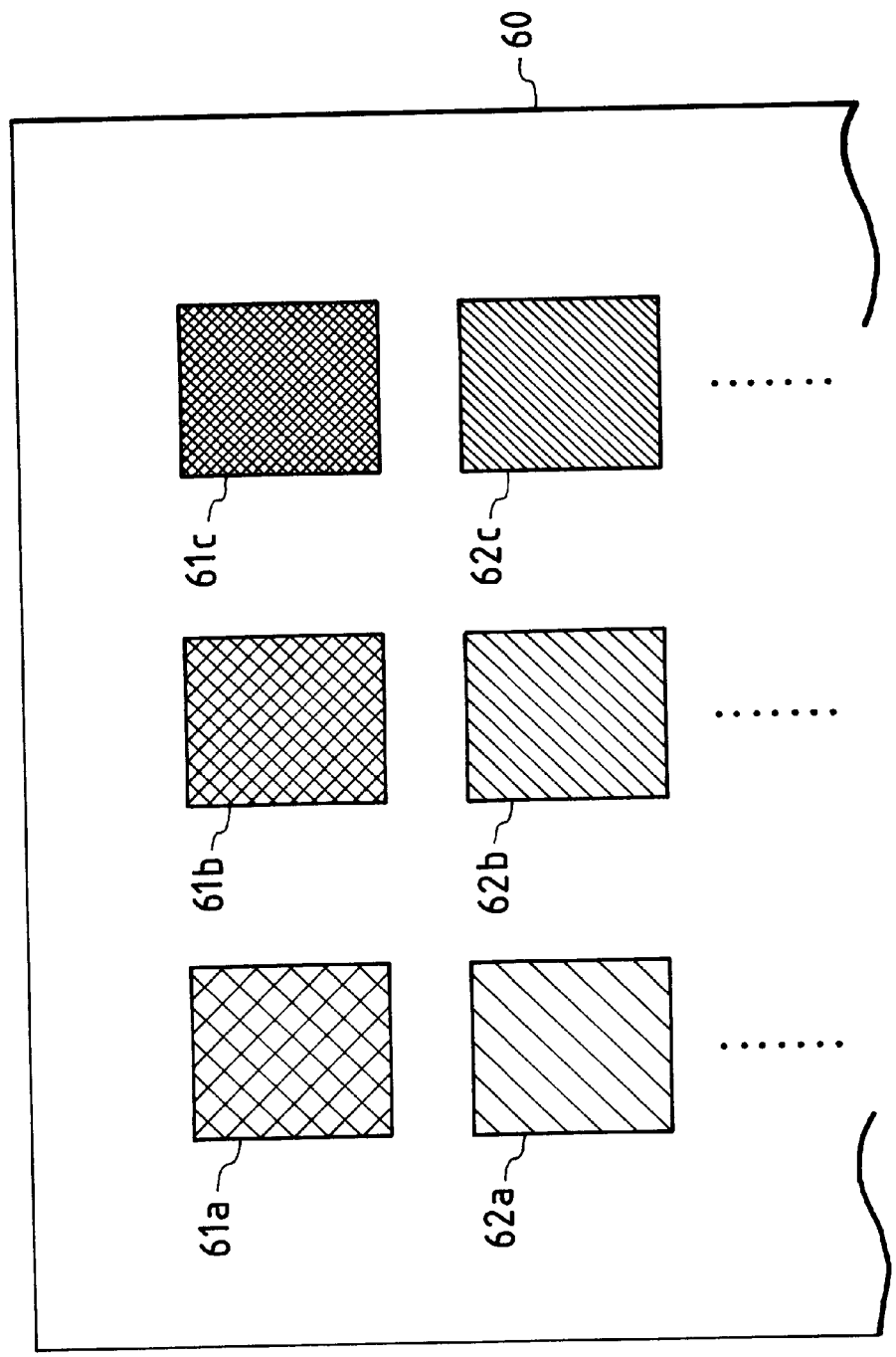
FIG. 2 shows an example of color patch sheet (color registration sheet)

A marker color registration circuit 55 is now explained. As shown in FIG. 2, the marker color registration circuit 55 reads a color patch sheet (color registration sheet) 6 prepared by a user by colors of markers to be registered at a predetermined position on the document sheet and processes the data to register the marker colors to be used. In FIG. 2, area 61a–61c are defined as coloring area for a green marker, areas 62a–62c are defined as coloring areas for a pink marker, and the user colors the area 61a by the green marker which the user wants to use by single painting rather than double painting, colors the area 61b by the green marker by the double painting, and colors the area 61c by the green marker by triple painting. Similarly, the user also colors the areas 62a–62c by the pink marker which the user want to use by single, double and triple painting, respectively. The color patch sheet 60 thus prepared is set to a predetermined position on a document sheet table of a scanner, not shown, and the reading by a color CCD 51 is started. The image signal of the patch converted to an 8-bit digital signal by an A/D converter 53 is applied to the marker color registration circuit 55.

Figure 3:
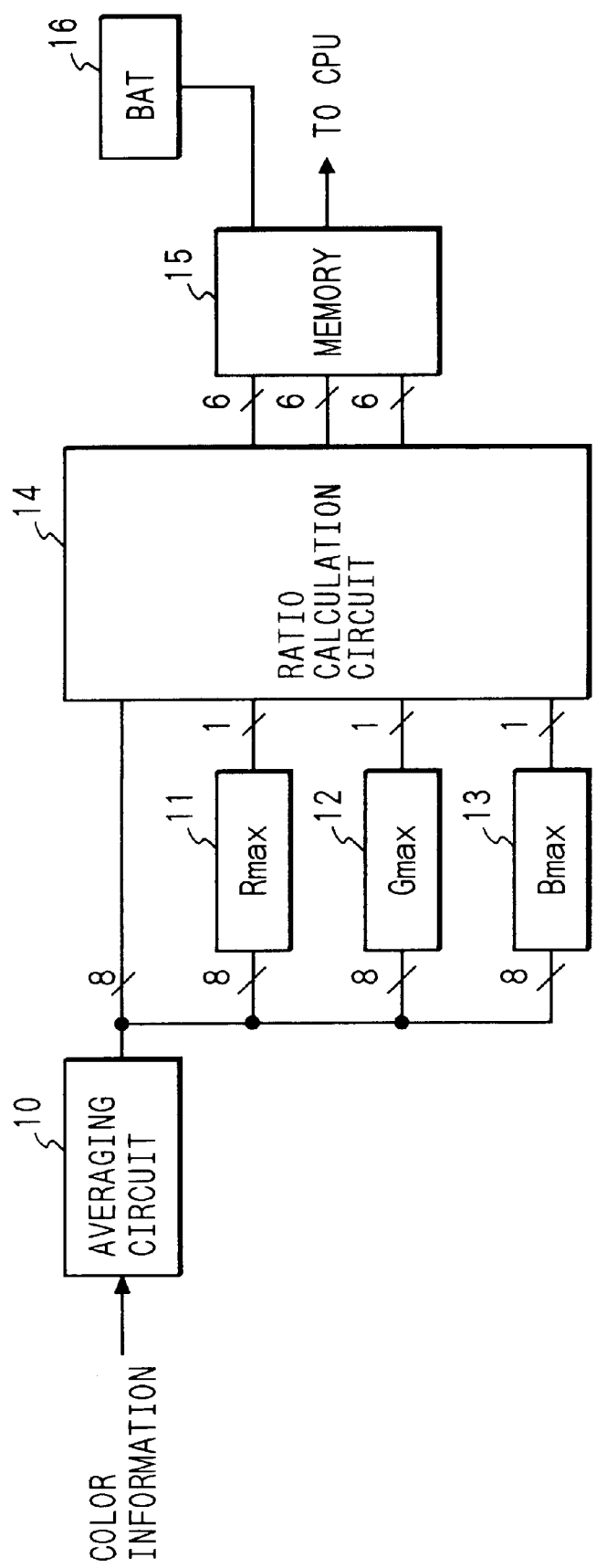
FIG. 3 shows a block diagram of a configuration of a marker color registration circuit of FIG. 1.

A configuration of the marker color registration circuit 55 is shown in FIG. 3. In FIG. 3, numeral 10 denotes an averaging circuit which samples input color information by 64 pixels, for example, for each RGB to calculate an average value. Numeral 11 denotes an Rmax detection circuit which outputs a signal "1" when a signal R of the output of the averaging circuit is FFh (all eight bits are "1" or the R component is maximum) and otherwise (00h to FEh) it outputs a signal "0". Numerals 12 and 13 denote a Gmax detection circuit and a Bmax detection circuit which have the same functions as the Rmax detection circuit and determine whether the signal G and the signal B are maximum or not, respectively. Numeral 14 denotes a ratio calculation circuit to which the output signals of the averaging circuit 10, the Rmax detection circuit 11, the Gmax detection circuit 12 and the Bmax detection circuit 13 are applied. The ratio calculation circuit 14 calculates ratios of the input R, G and B signal and output them as 6-bit ratio data for each color. Numeral 16 denotes a backup battery which is provided to provide a predetermined voltage to a memory 15 even after the apparatus is powered off to prevent the erasure of the stored data.

FIG. 4 shows a table of calculation rule of the ratio data. As seen from FIG. 4, when the ratio is calculated, factors to determine a reference color from RGB are the outputs of the Rmax detection circuit 11 to Bmax detection circuit 13.

In Type 1 in FIG. 4, all of the Rmax detection circuit 11 to Bmax detection circuit 13 output "0". In this case, the color having the second large data is used as of the reference and the magnitudes of the remaining two colors are represented with respect to the reference. For example, when the input RGB data are 43, A8 and 67, respectively, the B data (67) is used as the reference. Since the ratio data of the ratio detection circuit 14 is 6-bit data as described above, the reference data is defined as an intermediate value 20h. For other colors (R and G in the present example), by taking the fact that the ratios of ×¼ to ×4 to the reference are represented by the 6-bit data, ×¼ is set to 00h and ×4 is set to FFh so that a step difference of the data is 0.0625 time to the reference. Namely, if (R, G, B)=(43, A8, 67), the ratio data for the RGB outputted from the ration calculation circuit 14 are

R:G:B=0.6505:1.6311:1 or approximately (R, G, B)=(1Ah, 2Ah, 20h)

In Types 2 to 4, only one of the Rmax detection circuit 110 to Bmax detection circuit 13 outputs "1". In this case, the color which presents the maximum (the colors for the circuit which outputs "1") is defined as the reference 20h and the magnitudes of the remaining two colors are represented with respect to the reference.

In Types 5 to 7, two of the Rmax detection circuit 11 to Bmax detection circuit 13 output "1". In this case, since the first and second large data are FFh, it is set as the reference 20h. The color representing a minimum is calculated to be smaller than 20h. In this case, the color code determined by the succeeding stage color code determination circuit 54 is based only on the magnitude information of the color of the minimum value, but the color corresponding to the Type 7, for example, includes a very large magenta component and the types of the marker having such a color character available in the market place is one or two at most, and they may be readily determined.

In Type 8, all of the Rmax detection circuit 11 to Bmax detection circuit 13 output "1". Since such data is pure white data, it indicates that the marker is not painted at a predetermined patch position (color registration position). When the data corresponding to Type 8 is inputted, a control circuit, not shown, issues an alarm to an operator.

Figure 5A:
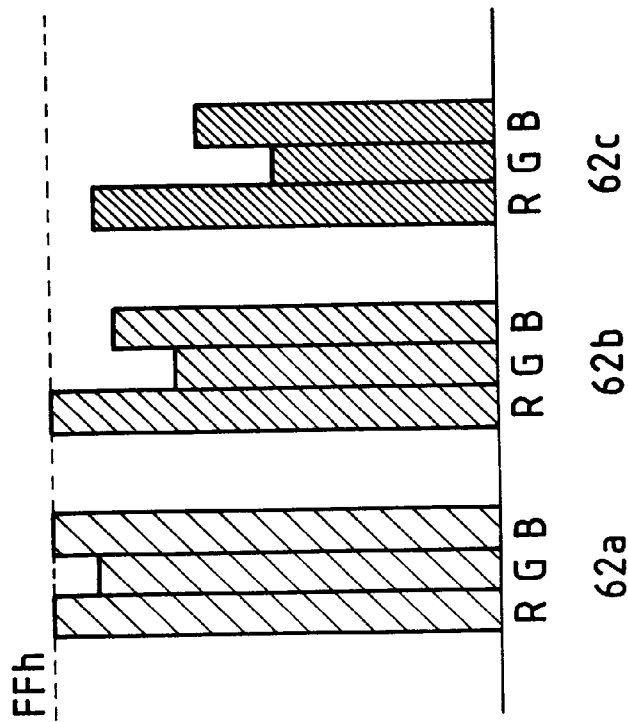

A filtering circuit 10 sequentially receives the color patches (color registration) shown in FIG. 2 in the sequence of 61a, 61b, 61c, 62a, 62b, 62c, . . . . The RGB ratios of the green marker are determined by 61a, 61b and 61c, and as shown in FIG. 5A, all signals are smaller than FFh and a change in the ratio due to the difference between patches (color registration) is little. Accordingly, (R, G, B)=(1Ah, 2Ah, 20h) is outputted from the ratio calculation circuit as an average value of the ratios of the three patches and the data is written into the memory 15.

Figure 5B:
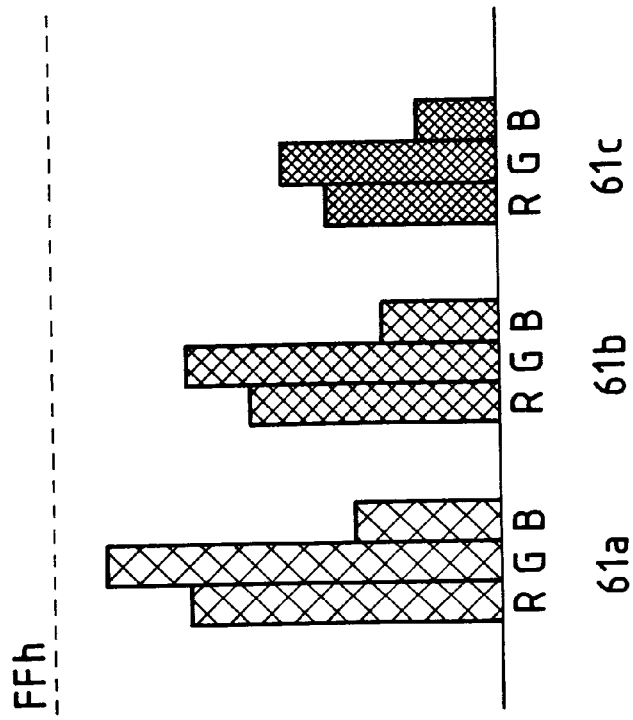

On the other hand, the read data of the color patches by the pink marker for the color patches 62a to 62c of FIG. 2 is shown in FIG. 5B. The R signal is FFh for the single painting and the double painting, and the B signal is FFh for the single painting. Accordingly, the ratios due to the difference between patchs are different for 62a to 62c. This phenomenon occurs because the pink marker does not substantially include C (cyan) which is a complementary color to R (red) and Y (yellow) which is a complementary color to G (green). In this manner, when at least one of the Rmax detection circuit 11-Bmax detection circuit 13 outputs "1", the data of the patches outputting "0" are disregarded and the data of the patches having a larger number of "1" is processed for the ratio calculation.

Figure 6:
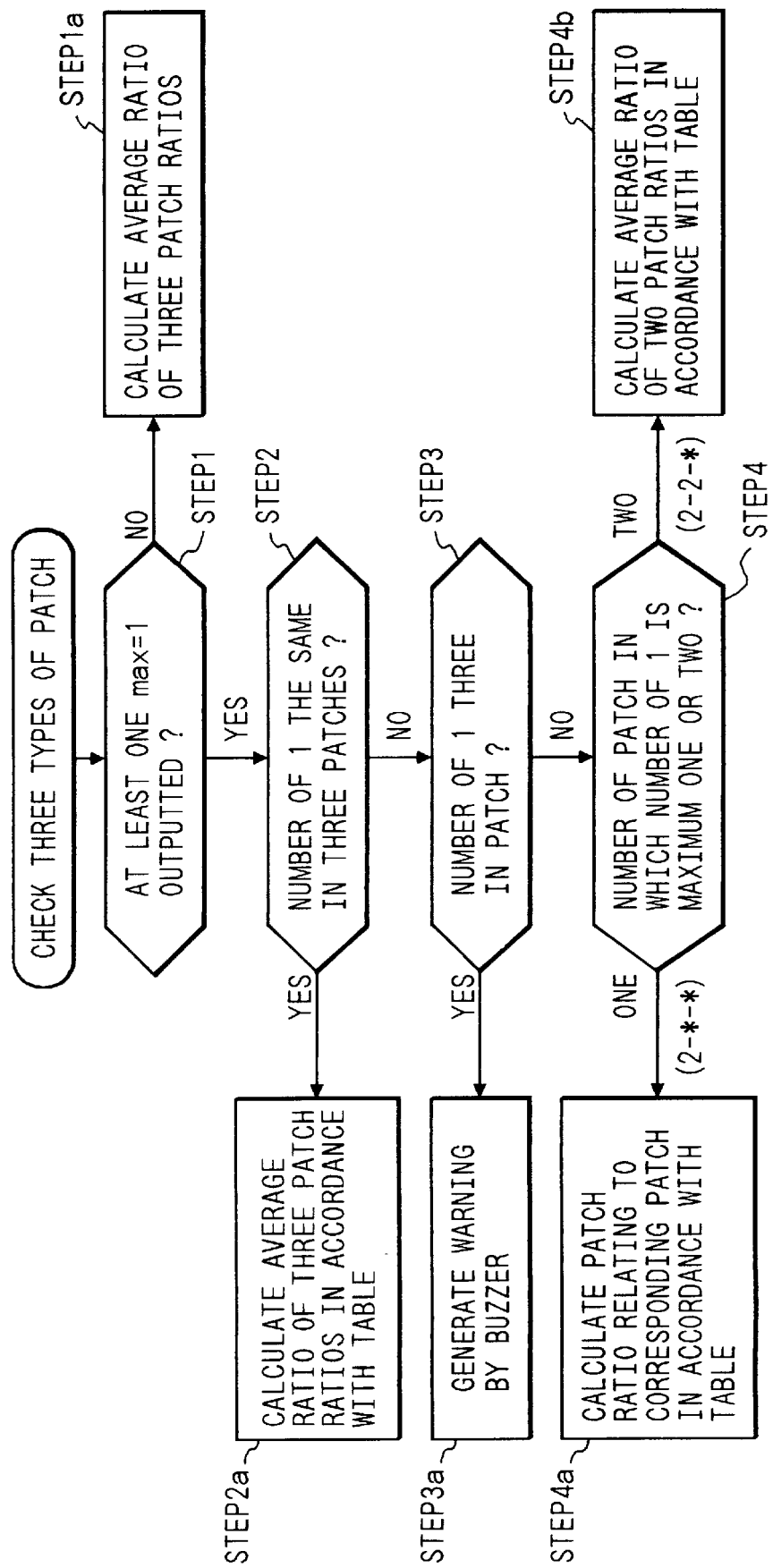
FIG. 6 shows a flow chart of a process in the ratio calculation circuit of FIG. 3.

FIG. 6 shows a flow chart of a process for determining which data is to be used for the calculation in the ratio calculation circuit 14.

In a step 1, whether "1" appears in the outputs of the Rmax detection circuit 11 to Bmax detection circuit 13 when the three patches are read is determined. If "1" does not appear, the process proceeds to a NO branch to calculate an average ratio in accordance with the condition of the Type 1 by referring a table of FIG. 4 (step 1a). The green patches 61a to 61c in FIG. 2 corresponds to the condition. If at least one "1" appears in the step 1, the process proceeds to a step 2.

In the step 2, whether the numbers of "1" appeared in the outputs of the Rmax detection circuit 11 to Bmax detection circuit 13 are equal for the three patches or not is determined. If YES, an average of the ratios is calculated in accordance with the table of FIG. 4 (step 2a). If NO, the process proceeds to a step 3. In the step 3, whether the user has colored by the marker at the predetermined position or not is determined. Namely, if there is a patch for which the number of "1" appeared in the outputs of the Rmax detection circuit 11 to Bmax detection circuit 13 is three, the process proceeds to a YES branch to issue an alarm by a buzzer (step 3a). This corresponds to the Type 8 of FIG. 4. If NO, the process proceeds to a step 4.

In the step 1, it is detected that the number of colors for FFh is at least one, and in the step 2, it is detected that the numbers of colors for FFh are not equal among the three patches, and in the step 3, the patch having three colors for FFh is not present in the three patches. Thus, in the step 4, combinations of the number of "1" appearing in the outputs of the Rmax detection circuit 11 to Bmax detection circuit 13 are only two, that is, 2-*-* (not limited to this order) or 2-2-* (not limited to this order) where * represents either "1" or "0". In the step 4, for the combination of 2-*-*, the data of only the patch for which two "1" appear is used to calculate the ratio in accordance with the table of FIG. 4 (step 4a). For the combination of 2-2-*, two data for which two "1" appear are used to calculate the ratios in accordance with the table of FIG. 4 and an average ratio data of them is calculated (step 4b).

For example, when the input data of the patch 62a by the pink marker shown in FIG. 5B is (R, G, B)=(FFh, 8Ch, FFh), the input data of the patch 62b is (R, G, B)=(FFh, 4Ah, D5h), and the input data of the patch 62c is (R, G, B)=(FFh, 2Eh, 8Eh), the process for the 2-*-* of the step 4 in FIG. 6 is conducted. Namely, it corresponds to the Type 6 of FIG. 4 and the ratio data (R, G, B)=(20h, 11h, 20h) derived from only the input data (R, G, B)=(FFh, 8Ch, FFh) of the patch 62a is calculated.

The ratio data thus calculated is stored in the memory 15 of FIG. 3. The memory 15 may comprise a RAM and as many addresses of the RAM as the number of markers to be registered need be provided. The memory 15 is controlled by a CPU, not shown, and the data is read as required and sent to a color code determination circuit 54 via the CPU. An operation of the color code determination circuit 54 is now explained.

Figure 7:
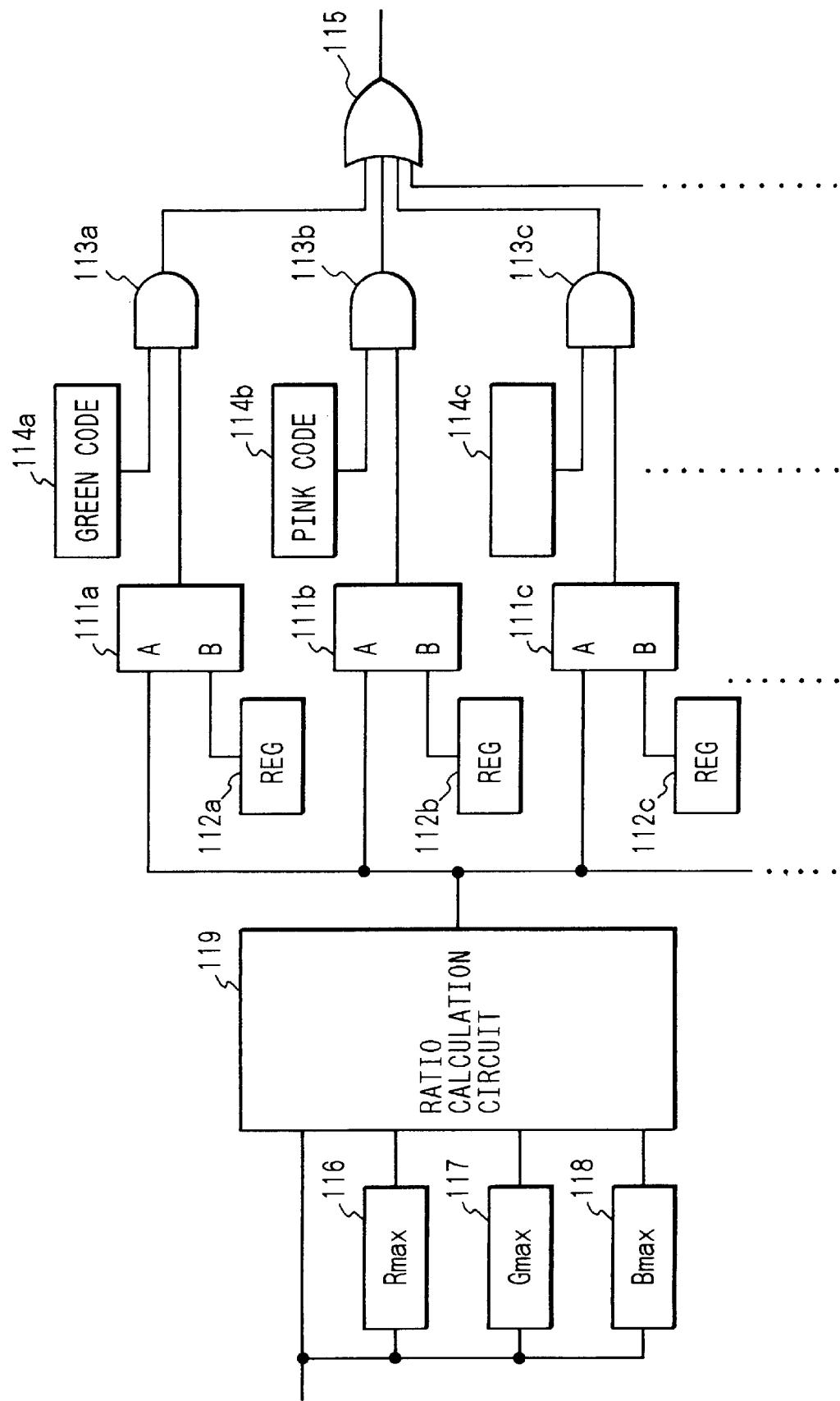
FIG. 7 shows a block diagram of a configuration of a color code determination circuit of FIG. 1.

FIG. 7 shows a configuration of the color code determination circuit 54. In FIG. 7, numerals 116 to 119 denote the Rmax detection circuit, Gmax detection circuit, Bmax detection circuit and ratio calculation circuit, which have the same functions as those of the Rmax detection circuit 11, Gmax detection circuit 12, Bmax detection circuit 13 and ratio detection circuit 14 shown in FIG. 3. Numeral 111a denotes a comparator for determining whether the output data of the ratio calculation circuit 119 is for the green marker or not. Similarly, numerals 111b, 111c, . . . denote comparators for determining whether the input data are for the ratios corresponding to single marker color or not, and as many such circuit as the number of markers to be registered are provided. A register 112a, 112b, 112c or . . . in which the ratio data for each marker read from the memory 15 of FIG. 3 is written is connected to the B input of each comparator.

For example, the green marker ratio data is written in the register 112a, and the pink marker ratio data is written in the register 112b. When the data applied to the terminal A and the data applied to the terminal B are similar, the comparator 111a, 111b, 111c or . . . outputs a signal "1". For example, when the ratio data for RGB is within ±2 error range, the CPU, not shown, controls the comparator to output the signal "1".

However, when the marker color is registered, if at least one of the Rmax detection circuit 11 to Bmax detection circuit 13 outputs "1" to the ratio calculation circuit 14 in the marker color registration circuit shown in FIG. 3, the approximation range is adjusted by the number of "1". Namely, if the number of "1" is one, each of the comparators outputs "1" if the ratio data of the RGB is within ±4 error range, and if the number of "1" is two, the comparator outputs "1" if the ratio data for the RGB is within ±8 error range.

In this manner, the control range of the comparator is changed in accordance with the number of "1" so that the color may be correctly determined for the marker colors having different ratios of RGB due to the overpaint condition of the pink marker. For the pink marker, if the comparator is set to output "1" when the ratio data of the RGB is within ±8 error range, the comparator 111b outputs "1" even when the ratio data of 62b and 62c of FIG. 5B are inputted.

The outputs of the comparators 111a, 111b, 111c, . . . are applied to AND gates 113a, 113b, 113c, respectively. Registers 114a, 114b, 114c, . . . in which predetermined color code data have been set are connected to other inputs of the AND gates 113a, 113b, 113c, . . . . For example, color code data (for example, 001) for the green marker is set in the register 114a and color code data (for example, 002) for the pink marker is set in the register 114b.

Numeral 115 denotes an OR gate to which all outputs of the AND gates 113a, 113b, 113c, . . . are supplied. Namely, the comparator which output the signal 71' by the ratio data outputted from the ratio calculation circuit 119 is only one of 111a, 111b, 111c, . . . so that the data outputted from the OR gate 115 corresponds to the color of the marker being read.

The output of the OR circuit 115 is inputted to the area determination circuit 56 as the output of the color code determination circuit 54 which determines whether the area being read belongs to the normal area, the line area or the paint area. The output of the area determination circuit 56 is inputted to the output color determination circuit 57 which determines the color to be outputted in accordance with the color code and the area mode, converts the data to 8-bit image data corresponding to the determined color and sends it to the succeeding stage image processing circuit.

Figure 8:
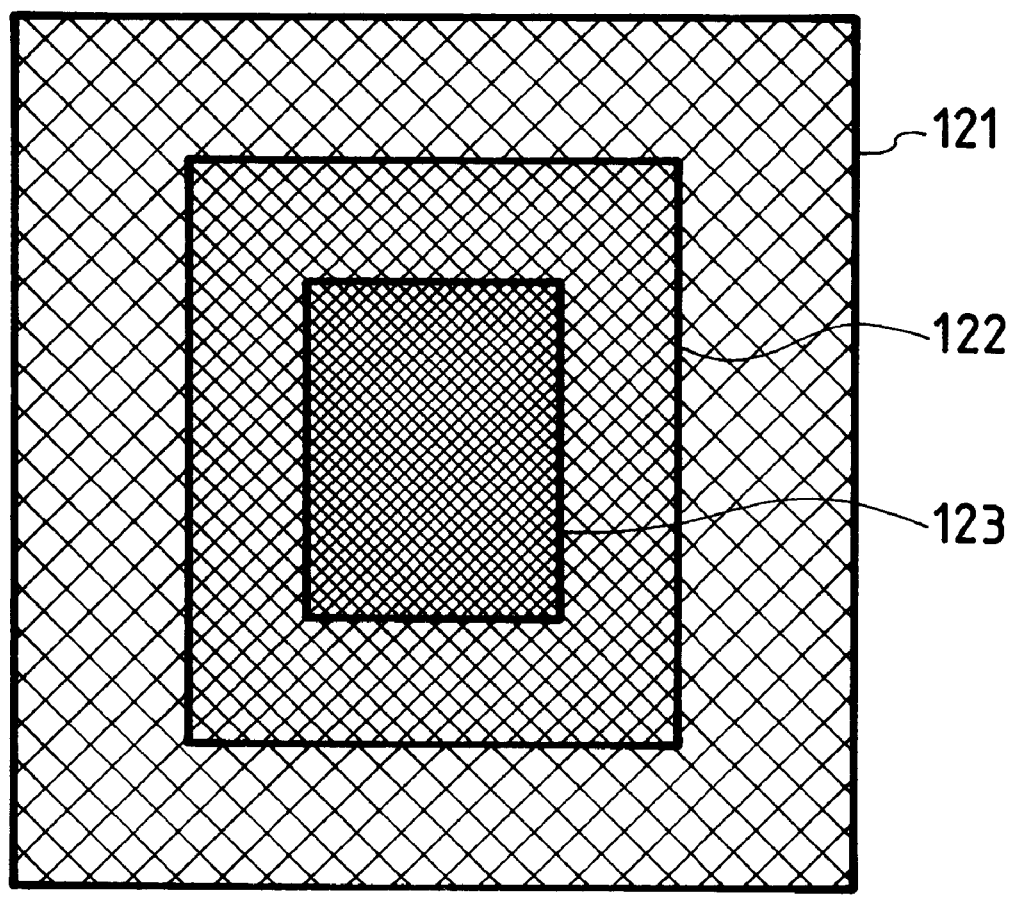
FIG. 8 shows another example of the color patch sheet.

In the above embodiment, the color patch sheet is color-painted by the format of FIG. 2 although a format as shown in FIG. 8 may be used. It reduces the irregularity in the color painting and the area of the color painting. In FIG. 8, numerals 121 to 123 denote black frames having a predetermined line width. The operator first paints the inside of the black frame 121 by a marker pen. Then, the operator paints the inside of the black frame 122 and finally paints the inside of the black frame 123.

A read sequence in the marker color registration while reading the color patch sheet of such a format is now explained. When black is detected in the read image data, it indicates the entry to the color patch area. Since the detected black is the black frame 121, the color data appear in next to the black is the single painted marker color. When the black is detected next time, the black is the black frame 122 and the color data appearing next to the black is the double painted marker color. When the black is detected further next time, the black is the black frame 123 and the color data appearing next to the black is the triple painted marker color. In this manner, the color data of the single painted through the triple painted marker colors are read to register the marker colors so that the color registration is attained at a high speed because the read area in the color registration is narrow. Further, since the color data after the detection of the black frame is recognized as the marker color, the correct color registration is attained even if the setting of the color patch sheet on the document sheet table is slightly offset.

The color is determined for the identical color marker in accordance with the registered single painted through triple painted color data without regard to the number of times of painting.

[Second Embodiment]

A second embodiment of the present invention is explained with reference to FIGS. 9 to 30H.

A content of the marker edition in the present embodiment is first explained. When the marker edition is conducted on a monochromatic document sheet by coloring by a color marker, an output as shown in FIG. 9 is produced. (1) As shown in an upper column of FIG. 9, the inside of a closed area encircled by a black line is marked. (It is necessary to mark adjacently within 1 mm from the black line.) Thus, the closed area is painted by the marker color. (2) As shown in a middle column of FIG. 9, the marking is made to cover the black line. (It is necessary that the periphery of the black line is painted with a width of 1 mm or wider.) Thus, the black line is substituted by the marker color. (3) As shown in a lower column of FIG. 9, the inside of the closed area encircled by the outer black line is marked with a first color and the marking is made by a second color to cover the inner black line (a combination of (1) and (2)). Thus, the inside of the outer black line is painted by the first color and the inner black line is substituted by the second color.

Figure 10:
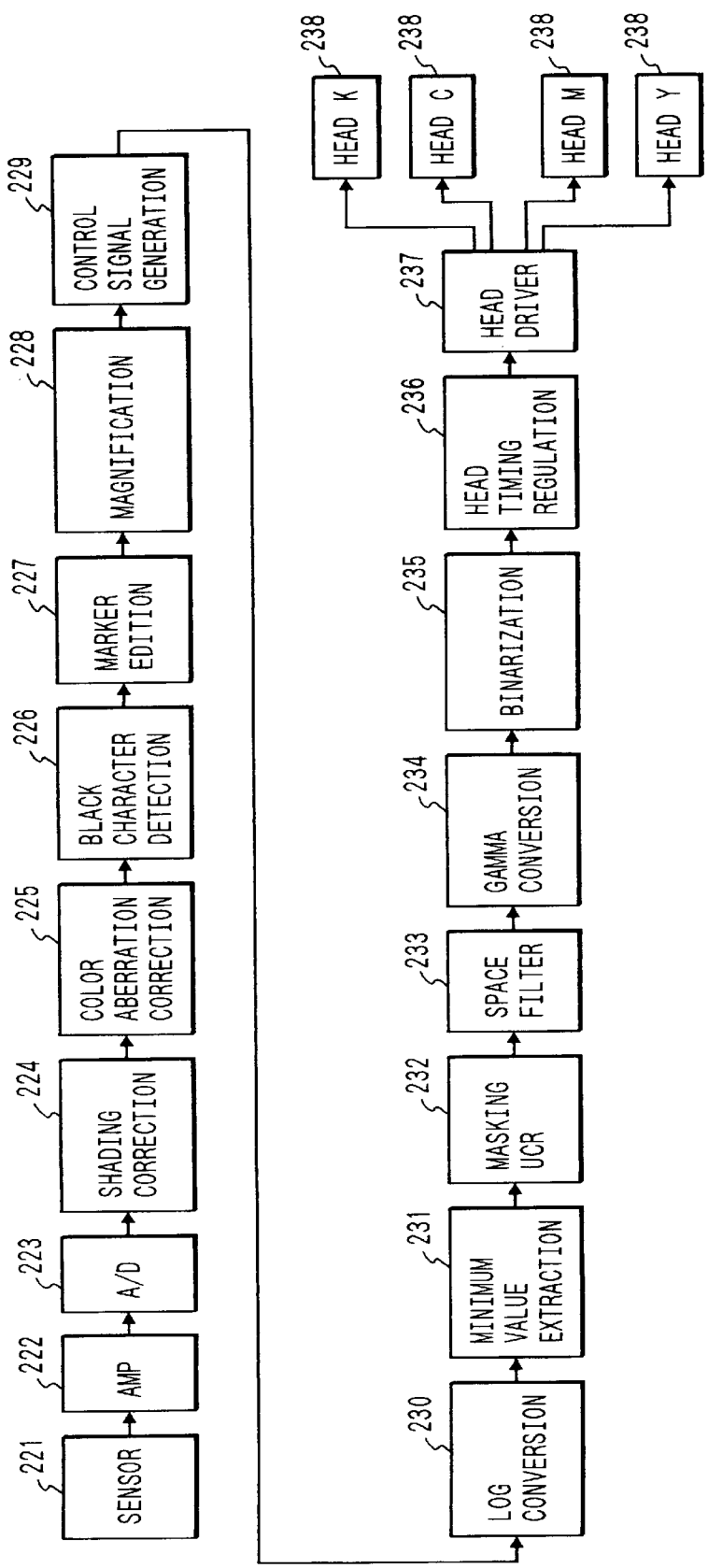
FIG. 10 shows a block diagram of a configuration of an image processing circuit for a color copying apparatus in accordance with the second embodiment of the present invention.

A configuration of an image processing unit of a full color copying apparatus used in the present embodiment in order to implement the above processes is shown in FIG. 10. Numeral 221 denotes a CCD line sensor which reads a document sheet image and outputs RGB data, numeral 222 denotes an amplifier circuit, numeral 223 denotes an AD converter for quantumizing the RGB data to an 8-bit digital value, numeral 224 denotes a shading correction circuit for shading-correcting the image data, numeral 225 denotes a color shift correction circuit for correcting the color shift of the RGB data, numeral 226 denotes a black character detection circuit for detecting a black character to generate a black character signal, numeral 227 denotes a marker edition circuit, numeral 228 denotes a variable magnification circuit for controlling enlargement/reduction, numeral 229 denotes a control signal generation circuit for generating signals to be used by a space filter 233 and a binarization circuit 235, numeral 230 denotes a LOG conversion circuit for logarithm-converting in accordance with a LOG table, numeral 231 denotes a minimum value extraction circuit for extracting a minimum value from the logarithm-converted CMY (cyan-magenta-yellow) data, numeral 232 denotes a masking/UCR circuit for conducting masking and UCR by a matrix operation, numeral 233 denotes a space filter circuit for conducting edge enhancement or smoothing, numeral 234 denotes a gamma conversion circuit for gamma-converting the input signal, numeral 235 denotes a binarization circuit for binarizing the 8-bit multi-value data by a dither method, numeral 236 denotes a head timing control circuit for adjusting between CMYK (cyan-magenta-yellow-black) heads, numeral 237 denotes a head driver circuit for driving the adjusted head, and numeral 238 denotes a four-color (CMYK) BJ ink head. In the marker edition process, the LOG conversion circuit 230 and the masking/UCR circuit 232 are set to just pass through the signal.

Figures 11, 11A:
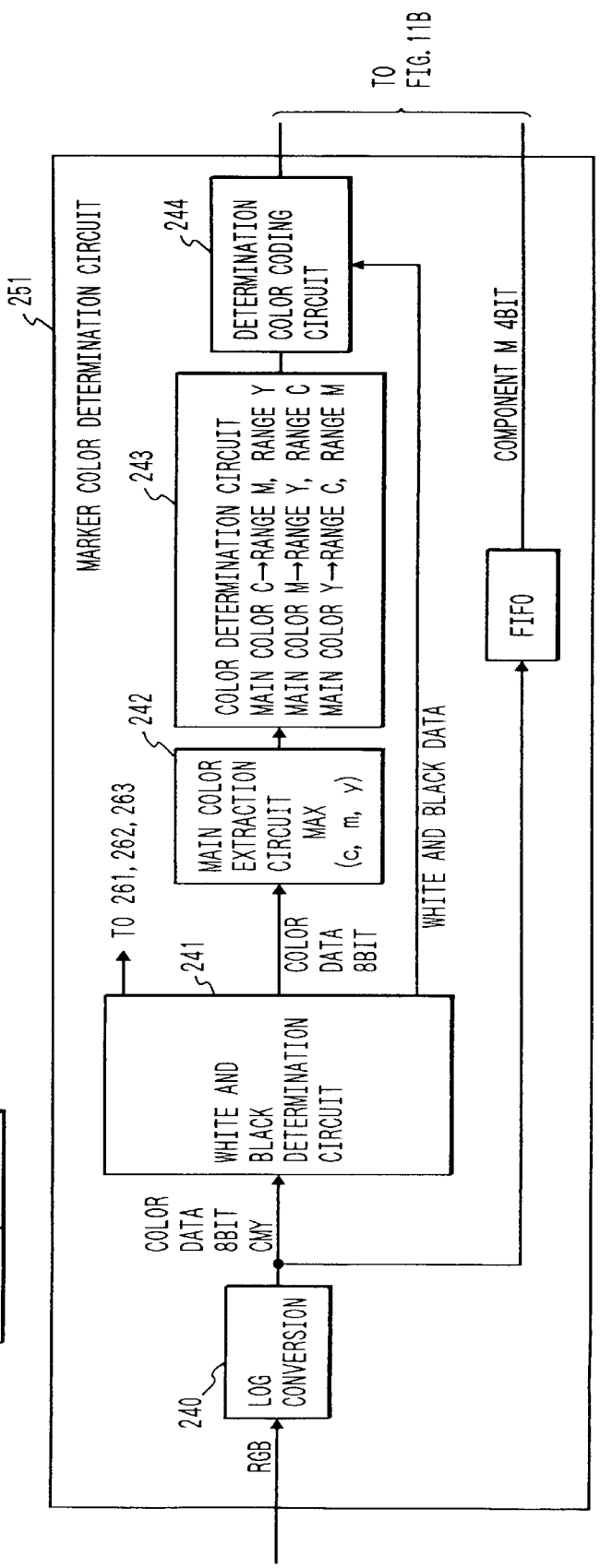
FIG. 11 is comprised of Figs. 11A and 11B showing block diagrams of a configuration of a marker edition circuit of FIG. 10.
Figure 11B:
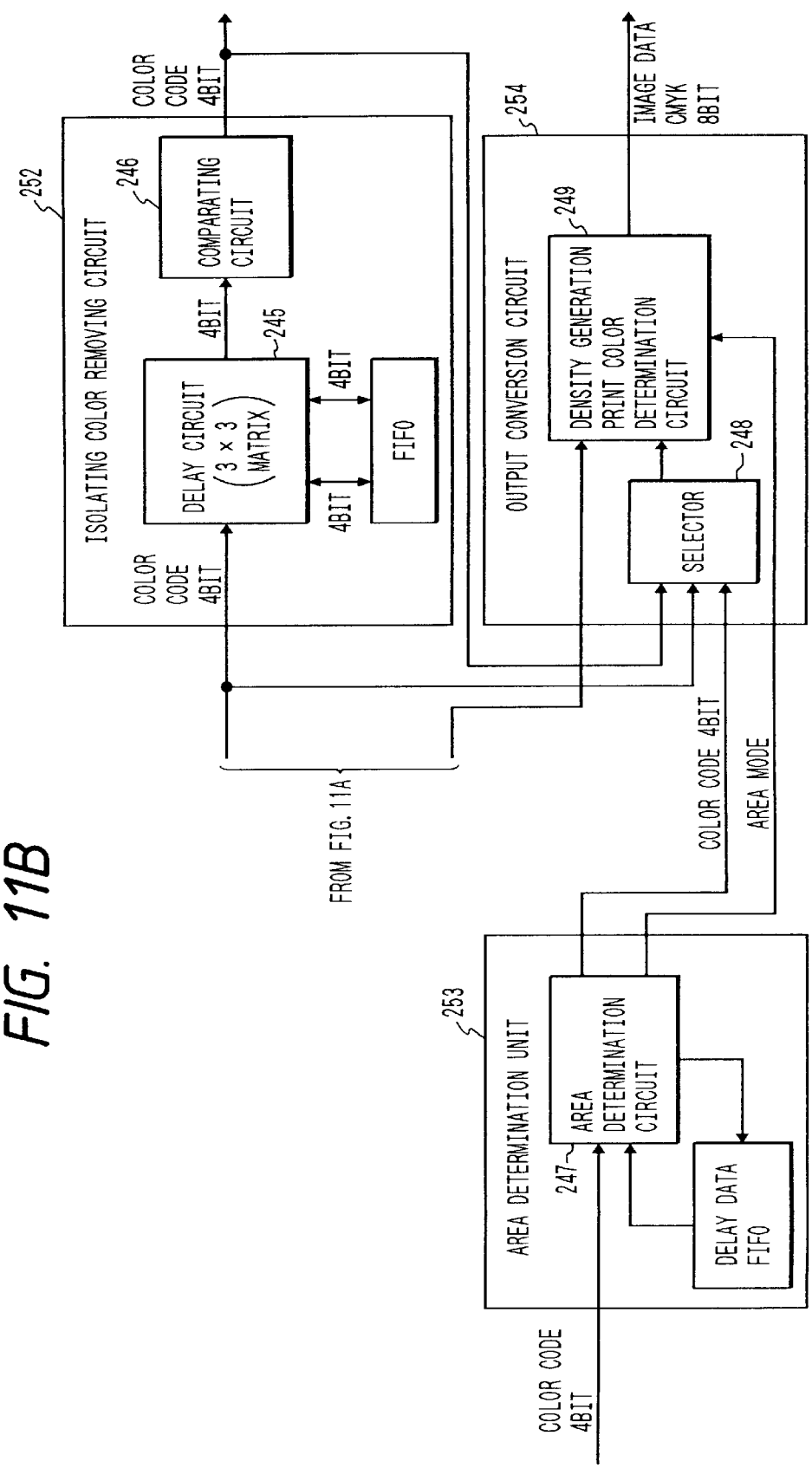

Detail of the marker edition circuit 227 is now explained with reference to an overall block diagram shown in FIGS. 11A and 11B. The image data comprising R, G and B 8-bit data is converted to C, M and Y 8-bit image data by the LOG conversion circuit 240 and supplied to a black-white determination circuit 241 which has a threshold for each of white and black, and if all of the C, M and Y data values are below the white threshold, the pixel is determined as white. If all of the data values are above the black threshold, the pixel is determined as black. The pixels determined as white or black are coded by a determination color coding circuit 244.

A pixel determined as a color other than white or black is supplied to a main color extraction circuit 242 which indicates which one of the C, M and Y components is maximum. A color determination circuit 243 then determines the color. As shown in FIG. 12, for each primary color (cyan, magenta and yellow) extracted by the primary color extraction circuit 242, ratios to the remaining two colors are determined to determine the color by the ratios of the C, M and Y components. For example, if the primary color is M (magenta) and C (cyan) is not more than ⅜ thereof and Y (yellow) is not more than ⅝ thereof, the pixel is determined as P (pink). As area in which the ratio of C, M and Y is substantially 1:1:1 is determined as black because light black (gray) which does not reach the black threshold level is also determined as black. Namely, two-level determination is made for black. In a table shown in FIG. 12 for determining the color by the ratios of the primary color to the remaining two components, the determination level to determine the color of the read image is variable. The detail of the color determination will be discussed later.

The C, M and Y components are used for the determination because each color has specific C, M and Y component compositions which are substantially fixed to the density of the color.

Figures 13, 14:
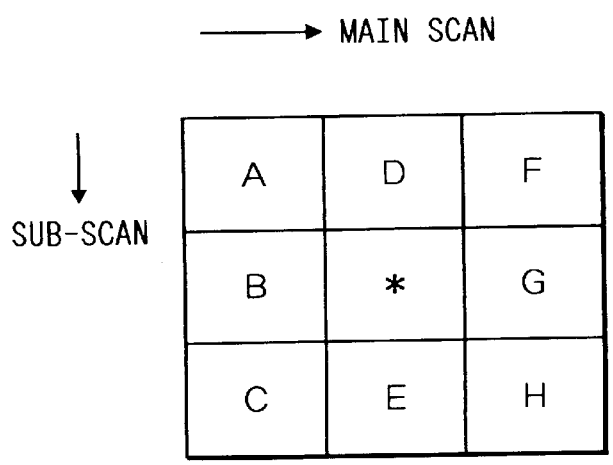
FIG. 13 shows a color code table.
FIG. 14 illustrates a discrete point elimination process.

The output of the color determination circuit 243 is converted to a 4-bit color code by the determination color coding circuit 244 as shown in FIG. 13 and the converted color code is inputted to a isolation color removing circuit 252 from the marker color determination circuit 251.

The isolation color removing circuit 252 observes pixels of a surrounding 3×3 matrix as shown in FIG. 14 to determine a center pixel * under consideration (target pixel) and the following processes 1) to 4) are sequentially executed.

1) If *≠A and *≠H, then *=A
2) If *≠C and *≠F, then *=C
3) If *≠D and *≠E, then *=D
4) If *≠B and *≠G, then *=B Namely, the processes are executed in the order of 1), 2), 3) and 4) and if the condition is met, the pixel under consideration is changed. Numeral 245 denotes a delay circuit for storing the surrounding eight pixels around the pixel under consideration and numeral 246 denotes a compare circuit for comparing among the pixels. The pixel under consideration may be changed to the left or upper pixel because a main scan direction is left→right and a sub-scan direction is top→bottom and the isolation color removing process for the pixels on the left side or upper side has been completed when the pixel under consideration is determined.

Through this process, the noise may be eliminated for the noisy image. However, when this process is executed, a one-pixel fine line may be eliminated and the reproducibility of a fine black character may not be well attained. Accordingly, two modes, that is, one mode in which the isolation color removing process is applied to the black pixel and the other mode in which it is not applied are provided. The output of the isolation color removing circuit is inputted to the area determination unit 253 as a 4-bit color code.

An area determination circuit 247 of the area determination unit 253 determines one of the following four areas for each pixel of the image.

1) Normal area
2) Paint area
3) Line area
4) Intra-paint line area

The normal area designates nothing and an initial value is set to this area. The paint area designates the painting in a closed area although a border black line is the normal area. The line area designates the substitution by the marker color. The intra-paint line area designates a combination of the paint area and the line area, that is, the line area in the paint area.

Figure 15:
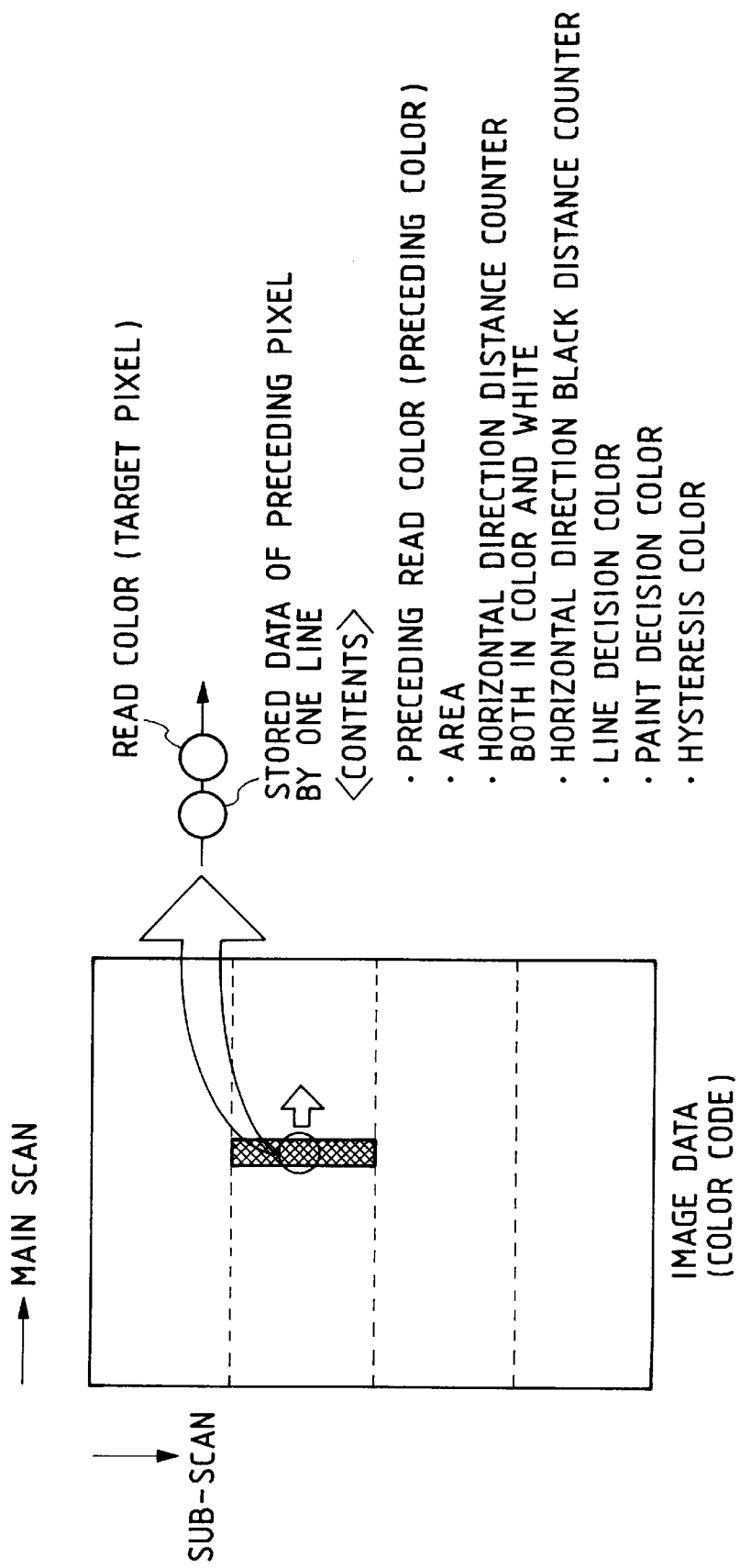
FIG. 15 illustrates stored data during area determination.

As shown in FIG. 15, the area determination circuit 253 has 128 pixel sensors along the sub-scan line and stores the data read for each pixel and the delayed data of the pixel at the immediately preceding pixel position along the main scan line. The delayed data includes a paint determination color for determining the color for the paint area, a line determination color for determining the color for the line or staggered line area, an area, a horizontal black counter for storing a distance from a black pixel along a sensor movement direction, a horizontal color counter for storing a distance from a color pixel and a preceding color which is a color of the pixel read in the immediately preceding line. A print color is determined by a logical combination of those data and the read data. Detail thereof is illustrated in FIGS. 16A through 19C.

For example, as shown in FIGS. 17A to 17C, when the preceding color is white and in the paint area and the current color is the marker color, the vertical and horizontal black distance counters are looked up and if it is determined to be close to black, it is determined as the paint area and the current color is printed and current color is set to the paint determination color. In FIGS. 16A through 19C, it should be noted that because the counter is used, the marking may be considered to be adjacent to black if it is within the predetermined condition even if the marking is not strictly adjacent to black. The condition for the marking allows a gap rather than protrusion because the protrusion does not allow the coloring for a sector graph while the gap allows the correction.

Since the counters are observed only vertically and horizontally, any marker color or black which is obliquely adjacent cannot be detected by the vertical and horizontal counters. In order to solve any malfunction, the area determination unit adds a process as shown in FIG. 20 to avoid the problem. In this process, if the pixel under consideration is white, the preceding color is the marker color and in the paint area and adjacent to black either horizontally or vertically, the pixel under consideration is substituted by the preceding color. As a result, the gap between black and the marker color is processed as if it were the marker color so that it is compatible to an oblique gap.

The vertical distance counter is not included in the stored data because it can be calculated in the sensor currently reading and hence it need not be stored.

The color code after the above processes is inputted to an output conversion circuit 254. The data is changed to the color code of the data before the area determination by a selector 248 and inputted to a density generation/print color determination circuit 249. The selector 248 is provided to allow to output the data for which only the color determination has been conducted.

The density generation/print color determination circuit 249 converts the 4-bit color code to the CMYK data by using a preset output color table. For black, it uses M (magenta) density data inputted to the marker edition circuit 227 to attain half-tone.

The output conversion mode includes the following three modes.

1) Standard back mode
2) Standard blue back mode
3) Special blue back mode

Figures 21, 25:
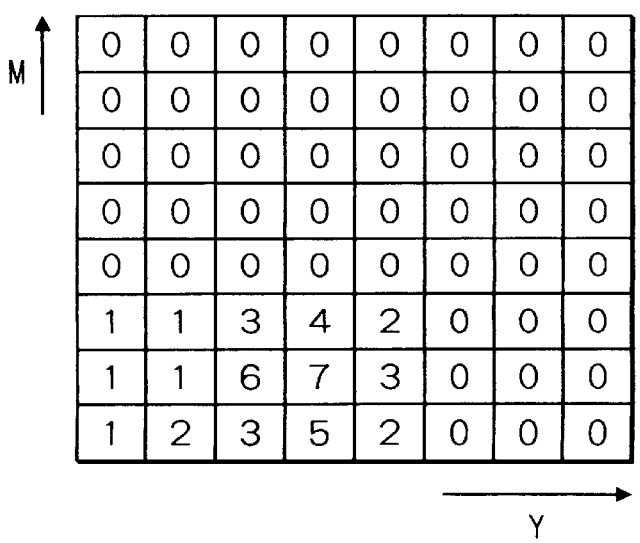
FIG. 21 shows an output color table.
FIG. 25 shows an example of frequency distribution when a cyan marker is read.

The standard back mode converts the color mode generated by the area determination circuit 252 by a CMYK output color table shown in FIG. 21. The standard blue back mode converts white in the standard back mode and pixels to be outputted to blue, and black and pixels to be outputted to white. It allows the preparation of a blue back sheet to be used for an OHP sheet. The special blue back mode is essentially identical to the standard blue back mode except that blue in the paint area is outputted as it is.

The CMYK data after the above process is further processed for changing magnification, masking and binarization in the circuit blocks shown in FIG. 10 and printed out by a printer unit.

The blue back process in the output conversion circuit 254 is specifically explained.

Let us assume a document sheet as shown in FIG. 22A. It is a side view of the image in which an ordinate represents a density. A left black line is one for a closed area and a laterally adjacent area is colored by a marker. A right black is a black character in a paint area. A hill shape black density indicates that the black density is low near the boundary of white and black. When the marker edition is applied to such an image, an output as shown in FIG. 22B is produced.

A left side of the black line representing the closed area is in the normal area and it is background blue. Since the black line represents white by using an inverted density, an edge of the black line becomes black. White in the paint area becomes painted marker color. The black character becomes a white character with a black edge by using the inverted density. If the marker color is a light color such as pink, black occurring between pink and white becomes prominent.

In order to solve this problem, the area information of the stored data and the paint determination color described above are used for the process to attain a result as shown in FIG. 22C. The black line has a normal area as the area information and does not have the paint determination color so that the inverted density is generated by blue which is the background color. Since the black character has the paint area as the area information and the marker color as the paint determination color, the edge of the character is filled with the high density of paint determination color because the half-tone is generated between the marker determination color and white, and hence no dust occurs (the generation of black at the edge is prevented).

FIG. 23 shows a chart representation of the above operation. It corresponds to the case where the partial print determination color is black and the paint area is blue back. The inverted density is generated from the black density information and the inverted density is multiplied as a factor to the paint table which is the paint determination color to process the edge of the character to comply with the surrounding color. In FIG. 23, A, B and C denote constants which are set to adjust the density.

Figure 24:
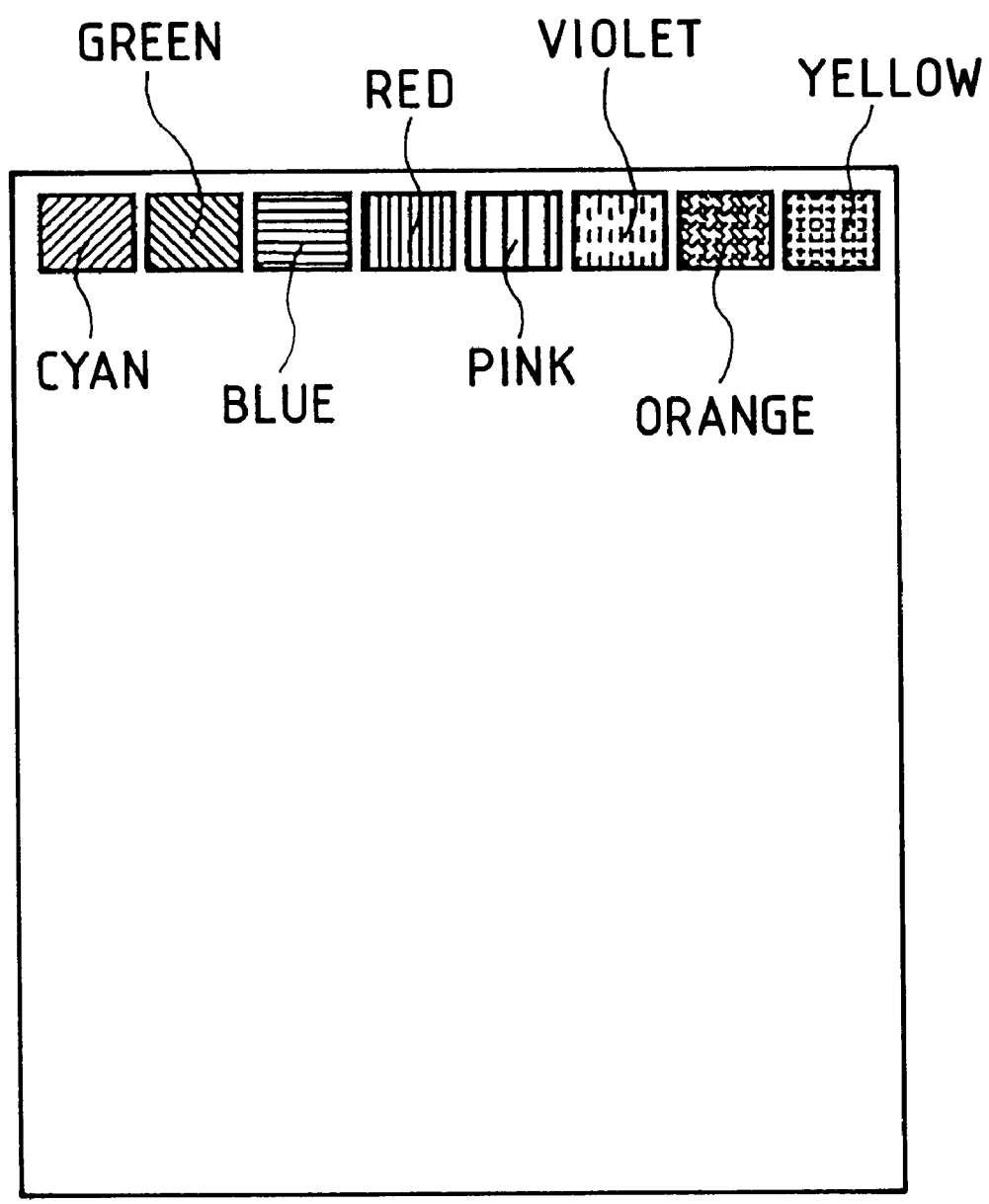
FIG. 24 shows a position of a marker to be painted at an edge of a document sheet.

A method for reading the marker color painted at the edge of the document sheet to set the color determination parameter is now explained. In the present embodiment, the marker colors to be determined are defined as eight colors, cyan, green, blue, red, pink, violet, orange and yellow, and the position to be painted by the markers is designated at an edge of the document sheet as shown in FIG. 24. When the marker edition mode is set and a copy button is depressed to start a copy operation, shading correction is effected to eliminate irregularity among pixels of the image read sensor 221. After the shading correction, the image read sensor 221 is moved to the position at which the document sheet painted by the cyan marker as shown in FIG. 24 is mounted and a histogram shown in FIG. 25 is prepared. The histogram represents a frequency distribution by ratios of a primary color extracted by the primary color extraction circuit 242 to the remaining two color components.

Figure 26:
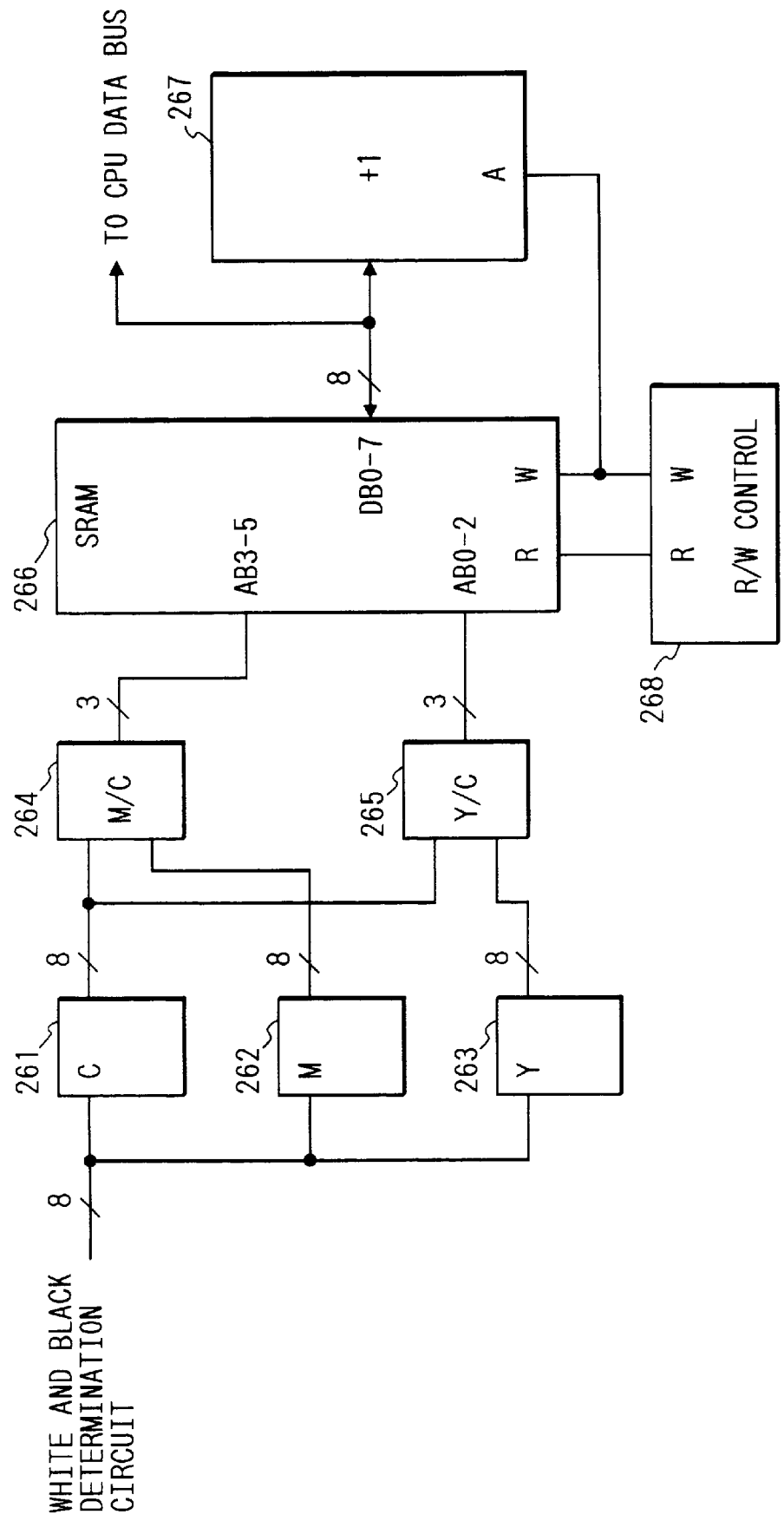
FIG. 26 shows a block diagram of a configuration of a color determination circuit.

The preparation of the frequency distribution is explained with reference to FIG. 26. FIG. 23 shows a block diagram of the color determination circuit 243. It illustrates the determination of cyan as the primary color by the primary color extraction circuit 242 by reading the document sheet painted by the cyan marker.

Numeral 261 denotes an 8-bit register which store the cyan image data which is the primary color, numeral 262 denotes an 8-bit register which stores the magenta image data, and numeral 263 denotes an 8-bit register which stores the yellow image data. The inputs of the 8-bit registers 261, 262 and 263 are connected to the output of the white-black determination circuit 241.

Numeral 264 denotes a division block which determines a ratio of magenta and cyan based on the cyan and magenta image data stored in the registers 261 and 262 to output a 3-bit signal, and numeral 265 denotes a division block which determines a ratio of yellow and cyan based on the cyan and yellow image data stored in the registers 261 and 263 to produce a 3-bit signal. Numeral 266 denotes an SRAM which receives the ratio of the primary color cyan to magenta and yellow determined by the division blocks 264 and 265 through an address bus to store the frequency distribution. Numeral 267 denotes an arithmetic operation unit which reads the data on the data bus, adds one to the read data and stores it when an input terminal A is at an H (high) level, and outputs the stored data to the data bus when the input terminal A is at an L (low) level. Numeral 268 denotes a write control unit which has a function to control the reading/writing of the SRAM 266.

The primary color is cyan and three colors, cyan, magenta and yellow for one pixel of the document sheet are stored in the registers 261, 262 and 263, and the read/write control unit 268 renders the output terminal R to the L level at a timing when the operation is completed. Since the output terminal R of the read/write control unit 268 is rendered to the L level, the SRAM 266 is set to the read mode and outputs the data at the address set by the address bus to the data bus, and the arithmetic operation unit 267 adds one to the data of the data bus. At the timing at which the addition by the arithmetic operation unit 267 is completed, the output terminal R of the read/write control unit 268 is rendered to the H level and the output terminal W is rendered to the L level. As the output terminal W of the read/write control unit 268 is rendered to the L level, the data bus of the SRAM 266 is set to the input mode and the data stored in the arithmetic operation unit 267 is outputted to the data bus. Then, the read/write control unit 268 renders the output terminal W to the H level. As the output terminal W of the read/write control unit 268 is changed from the L level to the H level, the data on the data bus is stored in the SRAM 266. Similarly, the frequency distribution tables for the primary color magenta and the primary color yellow are prepared.

The preparation of the frequency distribution table for one cyan pixel painted on the document sheet has been described above. In the present embodiment, the above process to determine the frequency distribution is repeated 100 times to sample 100 cyan points painted on the document sheet to prepare the frequency distribution tables.

Next, the image read sensor 221 is moved to the position at which the document sheet painted by the green marker as shown in FIG. 24 is mounted to prepare the frequency distribution tables for the primary color cyan and the remaining colors, magenta and yellow for the document sheet painted by green. Similarly, the image data at the positions painted by the blue, red, pink, violet, orange and yellow markers are read to prepare the frequency distribution tables. In preparing the frequency distribution tables, if a target position is not painted by the marker, a standard frequency distribution for the unpainted color is substituted. Finally, the frequency distribution tables are modified such that black is set as an area which has zero frequency distribution commonly to the primary color cyan and the remaining colors, magenta and yellow, and which is predetermined (in which cyan, magenta and yellow are dark to correspond to light black).

Figures 27, 27A:
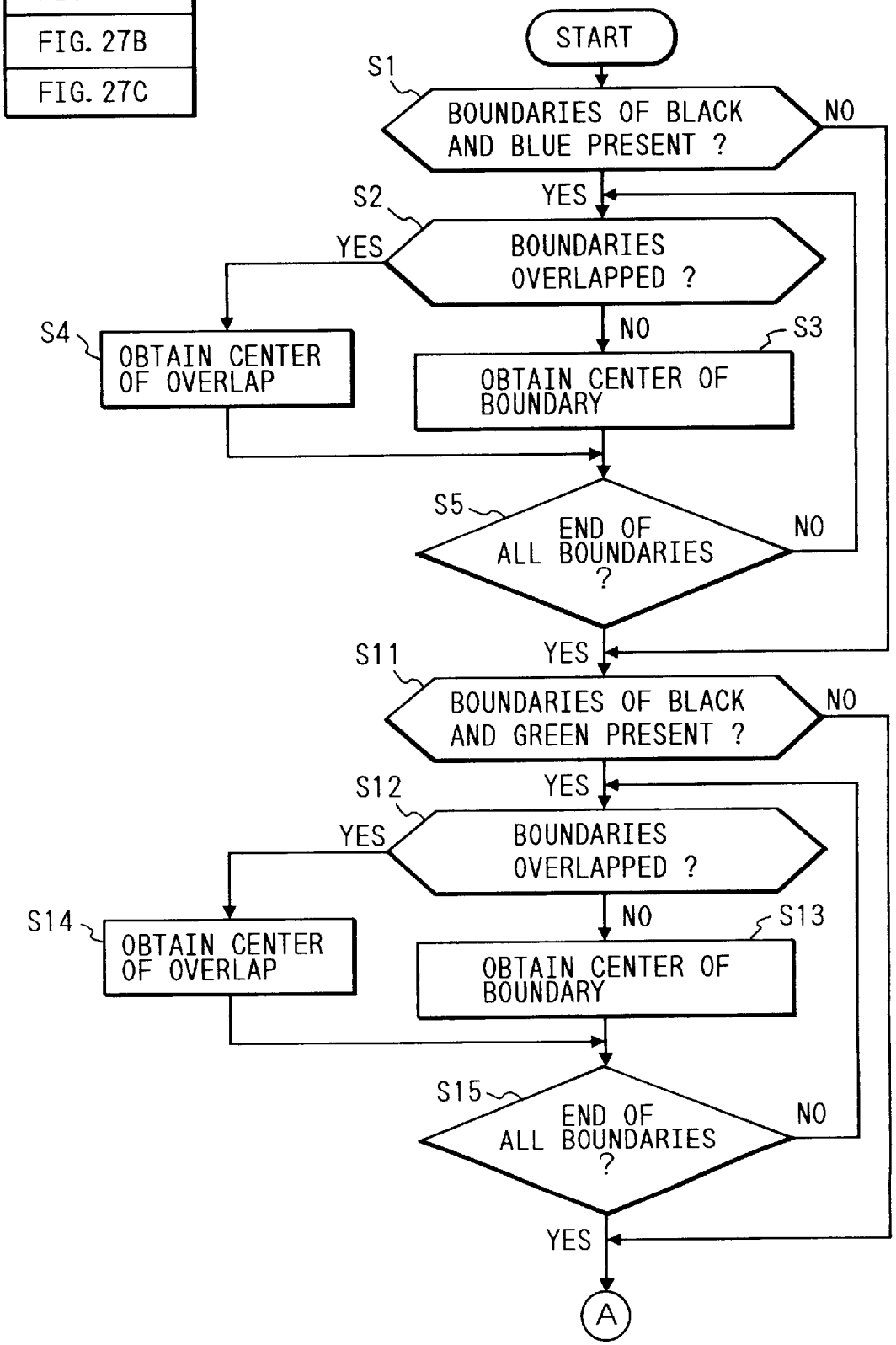
FIG. 27 is comprised of FIGS. 27A to 27C showing flow charts of a process for preparing color determination parameters.
Figure 27B:
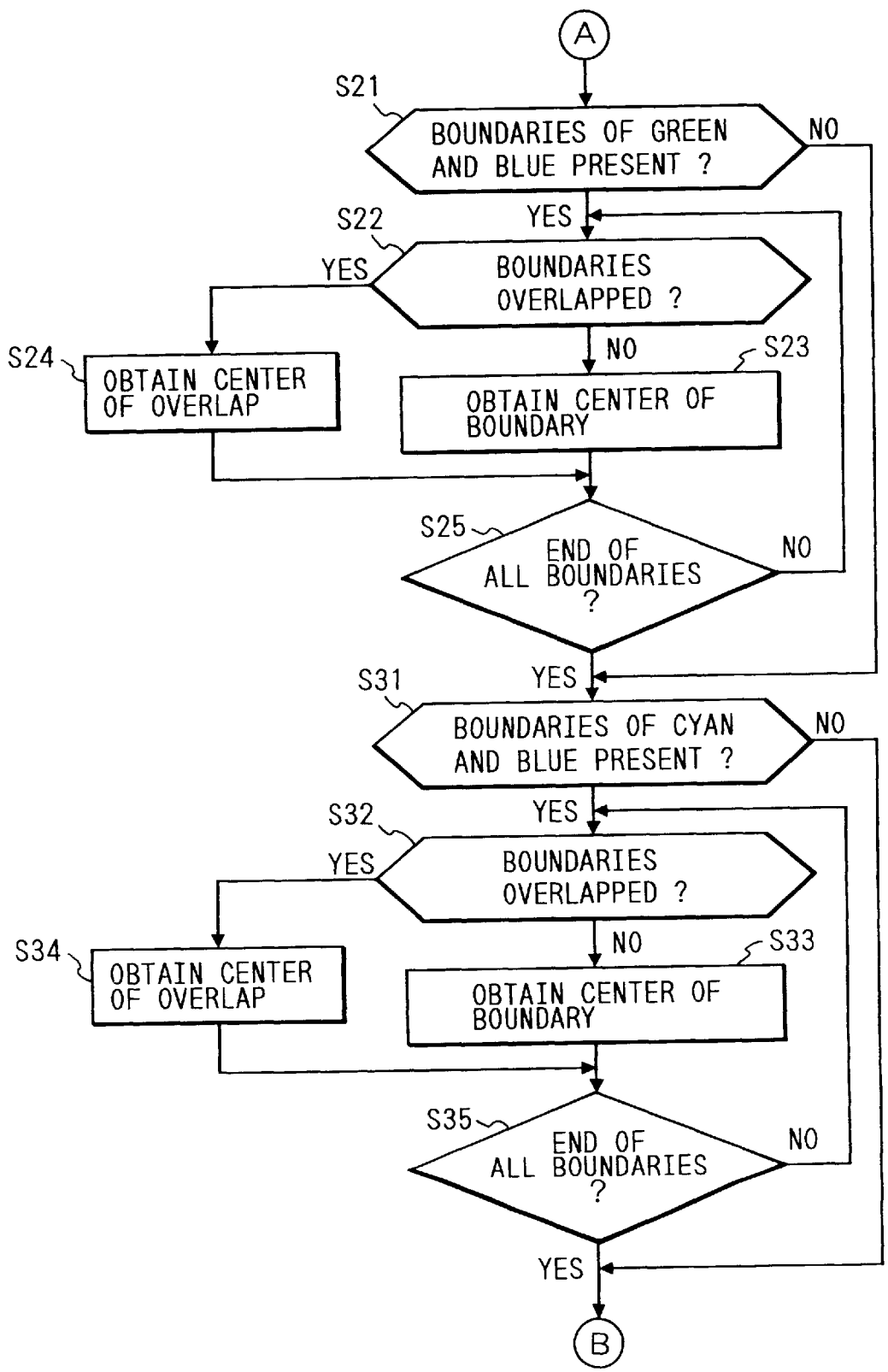
Figure 27C:
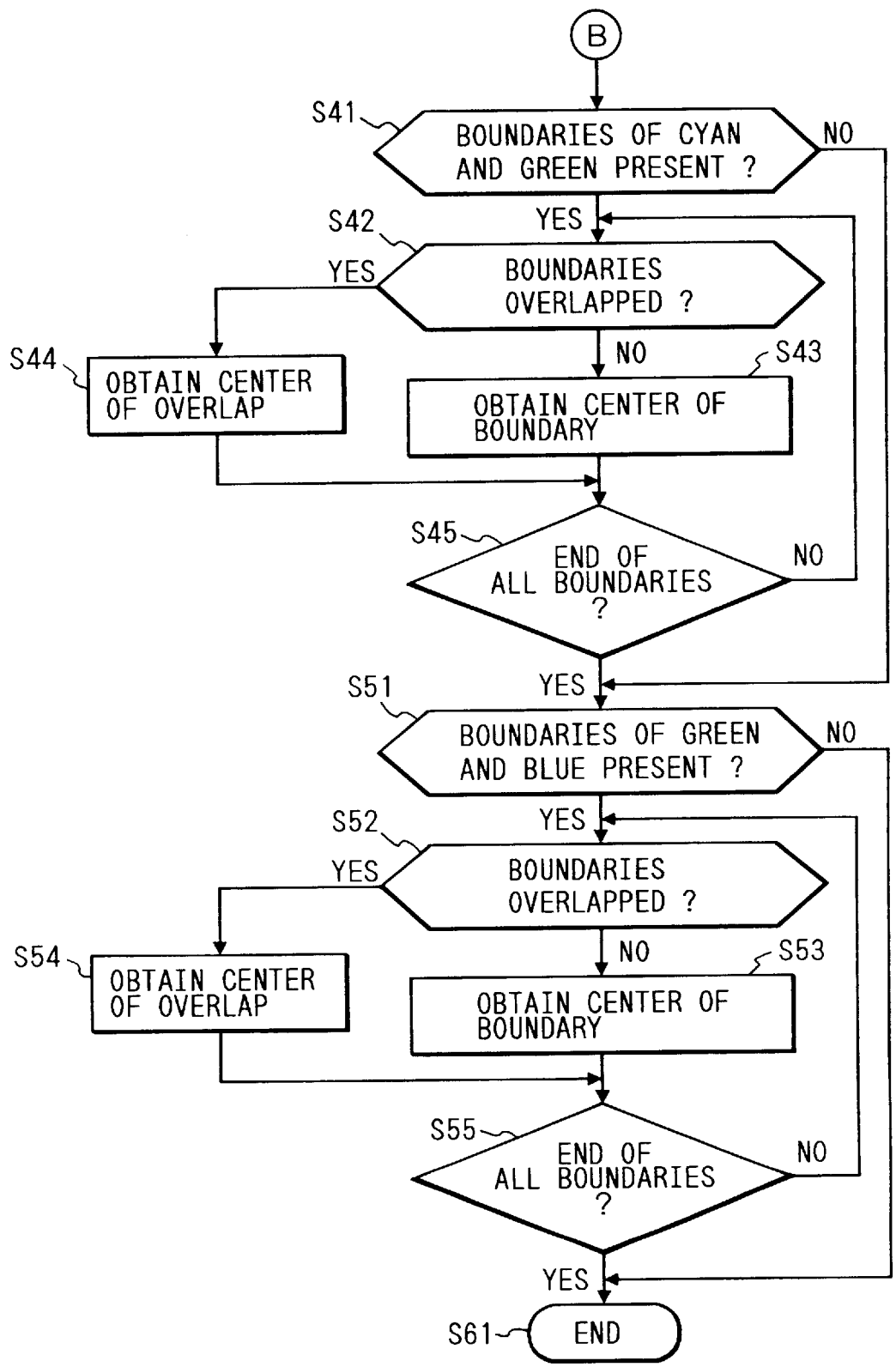
Figure 28A:
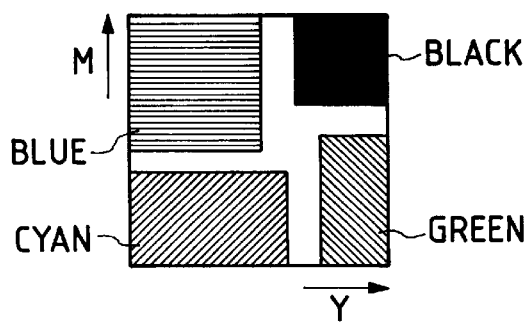
FIGS. 28A to 28G illustrate a color determination parameter preparation process.

Referring to a conceptual chart of FIGS. 28A to 28G and a flow chart of FIGS. 27A to 27C, a method for preparing marker read color determination parameters from the frequency distribution tables is explained. FIG. 28A shows a frequency distribution table for the primary color C (which is prepared by reading cyan, green, blue, red, pink, violet, orange, yellow and black and combining the frequency distribution tables for the respective colors). The frequency distribution table is stored in the SRAM 266 for each color and read by a CPU, not shown, and processed in accordance with the flow shown in FIGS. 27A to 27C.

In a step S1, whether black and blue areas are adjacent or not is determined. If they are adjacent, the process proceeds to a step S2, and if they are not adjacent, the process proceeds to a step S11.

In the step S2, the adjoining condition of the black and blue areas is determined. If the black and blue areas overlap, the process proceeds to a step S4, and if there is a gap (frequency 0) between the black and blue areas (FIG. 28A shows the condition with a gap), the process proceeds to a step S3.

In the step S3, a center between the black and blue areas is determined and the center between the areas is defined as a boundary of the black and blue area. The process then proceeds to a step S5.

In the step S4, a center between the overlapping black and blue areas is determined and it is defined as a boundary of the black and blue areas. The process then proceeds to the step S5.

Figure 28B:
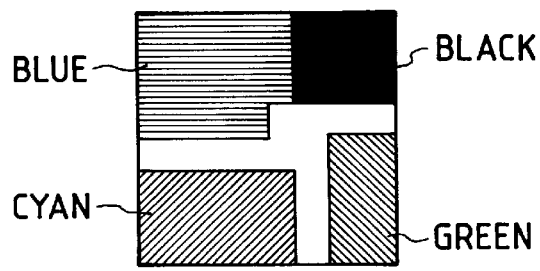

In the step S5, whether all processes to determine the boundary have been completed for the adjoining black and blue areas. If all processes to determine the boundary have been completed, the process proceeds to the step S11, and if any process to determine the boundary remains, the process returns to the step S2. FIG. 28B shows a frequency distribution after the completion of the step S5.

In the step S11, whether the black area and the green area are adjacent or not is determined. If they are adjacent, the process proceeds to a step S12, and if they are not adjacent, the process proceeds to a step S21.

In the step S21, the adjoining condition of the black and green areas is determined. If the black and green areas overlap, the process proceeds to a step S14, and if there is a gap (frequency 0) between the black and green areas, the process proceeds to a step S13.

In the step S13, a center between the black and green areas is determined and it is defined as a boundary of the black and green areas. The process then proceeds to a step S15.

In the step S14, a center of the overlapping black and green areas is determined and it is defined as a boundary of the black and green areas. The process then proceeds to the step S15.

Figure 28C:
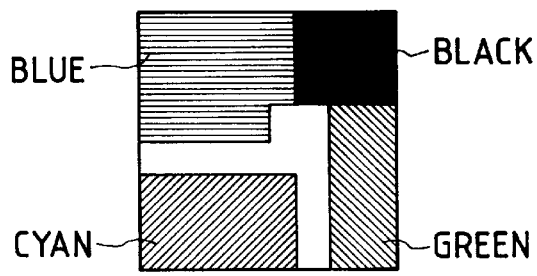

In the step S15, whether all processes to determine the boundary have been completed for the adjoining black and green areas or not is determined. If all processes to determine the boundary have been completed, the process proceeds to a step S21, and if any process to determine the boundary remains, the process returns to the step S12. FIG. 28C shows a frequency distribution after the completion of the step S15.

In the step S21, whether the blue area and the green area are adjacent or not is determined. If they are adjacent, the process proceeds to a step S22, and if they are not adjacent, the process proceeds to a step S31.

In the step S22, the adjoining condition of the blue and green areas is determined. If the blue and green areas overlap, the process proceeds to a step S24, and if there is a gap (frequency 0) between the blue and green areas, the process proceeds to a step S23.

In the step S23, a center between the blue and green areas is determined and it is defined as a boundary of the blue and green areas. The process then proceeds to a step S25.

In the step S24, a center of the overlapping blue and green areas is determined and it is defined as a boundary of the blue and green areas. The process then proceeds to the step S25.

Figure 28D:
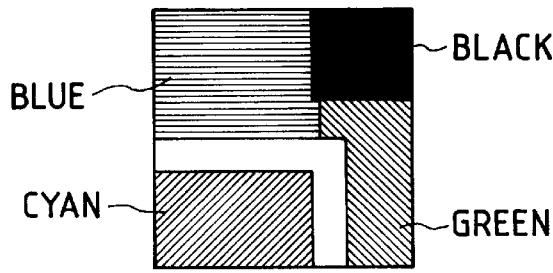

In the step S25, whether all processes to determine the boundary have been completed for the adjoining blue and green areas or not is determined. If all processes to determine the boundary have been completed, the process proceeds to a step S31, and if any process to determine the boundary remains, the process returns to the step S22. FIG. 28D shows a frequency distribution after the completion of the step S25.

In the step S31, whether the blue area and the cyan area are adjacent or not is determined. If they are adjacent, the process proceeds to a step S32, and if they are not adjacent, the process proceeds to a step S41.

In the step S32, the adjoining condition of the blue and cyan areas is determined. If the blue and cyan areas overlap, the process proceeds to a step S34, and if there is a gap (frequency 0) between the blue and cyan areas, the process proceeds to a step S33.

In the step S33, a center between the blue and cyan areas is determined and it is defined as a boundary of the blue and cyan areas. The process then proceeds to a step S35.

In the step S34, a center of the overlapping blue and cyan areas is determined and it is defined as a boundary of the blue and cyan areas. The process then proceeds to the step S35.

Figure 28E:
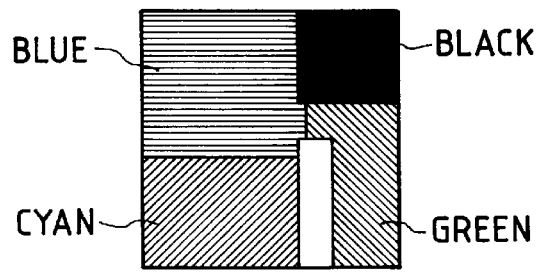

In the step S35, whether all processes to determine the boundary have been completed for the adjoining blue and cyan areas or not is determined. If all processes to determine the boundary have been completed, the process proceeds to a step S41, and if any process to determine the boundary remains, the process returns to the step S32. FIG. 28E shows a frequency distribution after the completion of the step S35.

In the step S41, whether the green area and the cyan area are adjacent or not is determined. If they are adjacent, the process proceeds to a step S42, and if they are not adjacent, the process proceeds to a step S51.

In the step S42, the adjoining condition of the green and cyan areas is determined. If the green and cyan areas overlap, the process proceeds to a step S44, and if there is a gap (frequency 0) between the green and cyan areas, the process proceeds to a step S43.

In the step S43, a center between the green, blue and cyan areas is determined and it is defined as a boundary of the green and cyan areas. The process then proceeds to a step S45.

In the step S44, a center of the overlapping green and cyan areas is determined and it is defined as a boundary of the green and cyan areas. The process then proceeds to the step S45.

Figure 28F:
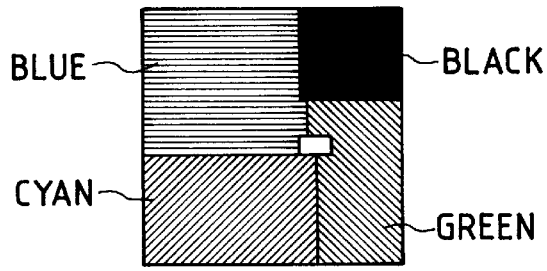

In the step S45, whether all processes to determine the boundary have been completed for the adjoining blue and green areas or not is determined. If all processes to determine the boundary have been completed, the process proceeds to a step S51, and if any process to determine the boundary remains, the process returns to the step S42. FIG. 28F shows a frequency distribution after the completion of the step S45.

In the step S51, whether the green area and the blue area are adjacent or not is determined. If they are adjacent, the process proceeds to a step S52, and if they are not adjacent, the process proceeds to a step S61.

In the step S52, the adjoining condition of the green and blue areas is determined. If the green and blue areas overlap, the process proceeds to a step S54, and if there is a gap (frequency 0) between the green and blue areas, the process proceeds to a step S53.

In the step S53, a center between the green and blue areas is determined and it is defined as a boundary of the green and blue areas. The process then proceeds to a step S55.

In the step S54, a center of the overlapping green and blue areas is determined and it is defined as a boundary of the green and blue areas. The process then proceeds to the step S55.

Figure 28G:
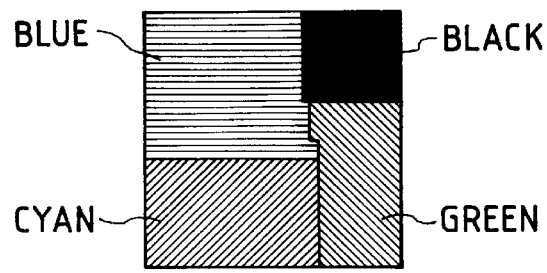

In the step S55, whether all processes to determine the boundary have been completed for the adjoining green and blue areas or not is determined. If all processes to determine the boundary have been completed, the process proceeds to a step S61, and if any process to determine the boundary remains, the process returns to the step S52. FIG. 28G shows a frequency distribution after the completion of the step S55.

In the step S61, the process to determine the boundary for the primary color of cyan is completed. Similarly, the processes to determine the boundary for the primary color of magenta and the primary color of yellow are also conducted.

The result of the above process for reading the marker colors painted on the edge of the document sheet to set the read color determination parameters is used in the color determination circuit 243 in the actual copy operation. When only the marker is painted at the edge of the document sheet (no black present), the marker at the edge of the document sheet is not printed on the print sheet in accordance with a rule of marker processing.

By using the color determination parameters (for example, see FIG. 28G) set in accordance with the result of reading the marker actually painted on the document sheet, the affect by the variation of the color of the sheet, the color of the marker and the characteristic of the read sensor is eliminated and correct color determination is attained.

Referring to FIGS. 29A to 29H and FIGS. 30A to 30H, a modification of the second embodiment is now explained. In the present embodiment, in reading the marker painted at the edge of the document sheet to set the color determination parameters, a basic pattern of the color determination parameters is predetermined and the basic pattern of the color determination parameters are corrected in accordance with the result of reading the marker painted on the document sheet.

Figure 29B:
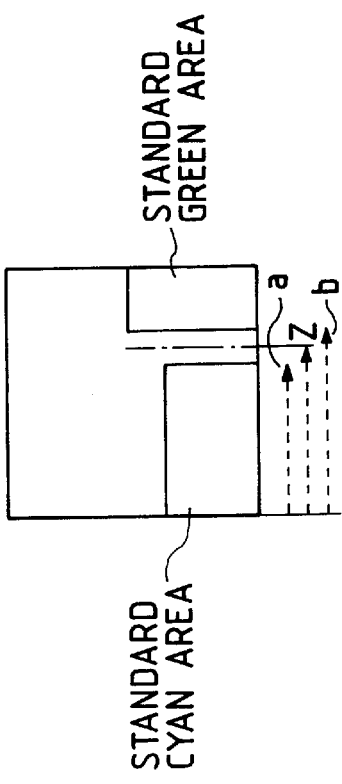
FIGS. 29A to 29H illustrate a color determination parameter correction process.
Figure 29D:
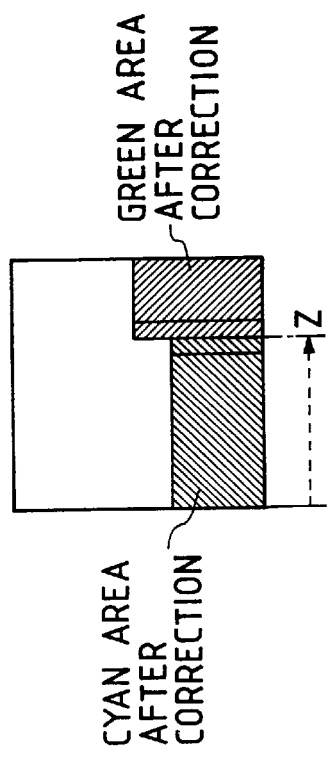
Figure 29A:
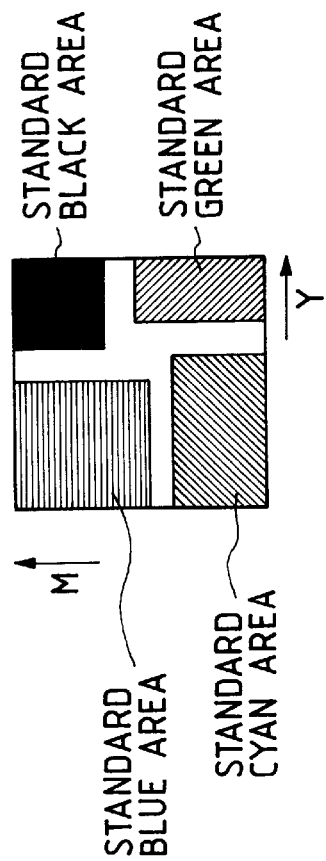

In FIG. 29A, cyan is used as a primary color in the basic pattern of color determination parameters. The basic pattern of color determination parameters (hereinafter referred to as an area) are in a distribution area for the reading of the document sheet painted in a normal condition of use.

In FIG. 29B, the cyan and green areas are extracted from FIG. 29A. In FIG. 29B, a denotes a distance to an edge of a standard cyan area along a yellow direction with respect to a point at which yellow and magenta are zero, b denotes a distance to an edge of a standard green area along the yellow direction with respect to the point at which yellow and magenta are zero, and Z denotes a distance to a boundary of the cyan and green areas after the correction of the color determination parameters.

Figure 29C:
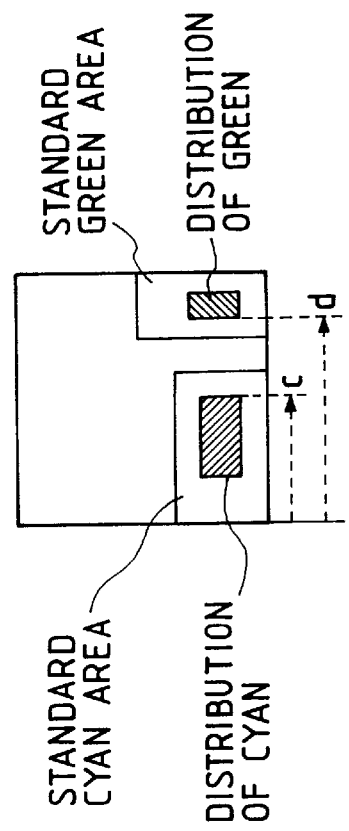

In FIG. 29C, the marker painted at the edge of the document sheet is read to prepare the frequency distribution. The cyan and green distributions are within the standard cyan area and the standard green area. In FIG. 29C, c denotes a distance to an edge of the cyan distribution along the yellow direction with respect to the point at which yellow and magenta are zero, and d denotes a distance to an edge of the green area along the yellow direction with respect to the point at which yellow and magenta are zero. In FIG. 29D, the cyan area and the green area in FIG. 29C are corrected and a boundary Z of the cyan and green is shown. It meets a relation of $$Z = a + (b-a) \times (d-b) \div \{(a-c) + (d-b)\}$$

Namely, the distance (b−a) between the edge of the standard cyan area and the edge of the standard green area is determined, and the determined distance is divided by the distance (a−c) between the edge of the standard cyan area and the edge of the cyan distribution and the distance (d−b)

between the edge of the standard green area and the edge of the green distribution to determine the boundary Z of the cyan and green. The corrected cyan area is shown with the same symbol but a solid line is drawn on the boundary in order to distinguish the corrected cyan area from the standard cyan area. Similarly, solid lines are drawn in the corrected green area as well as the drawings following to FIG. 29A to 29H.

Figure 29E:
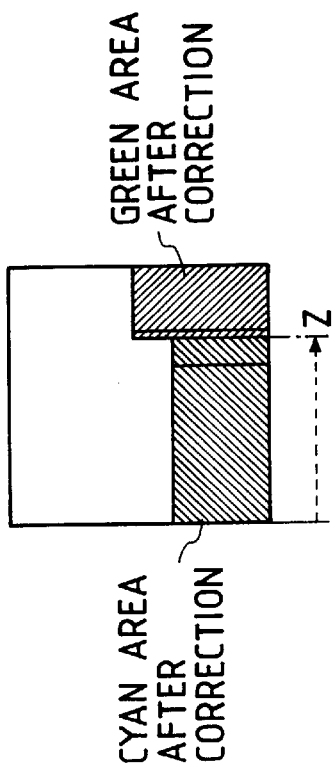
Figure 29F:
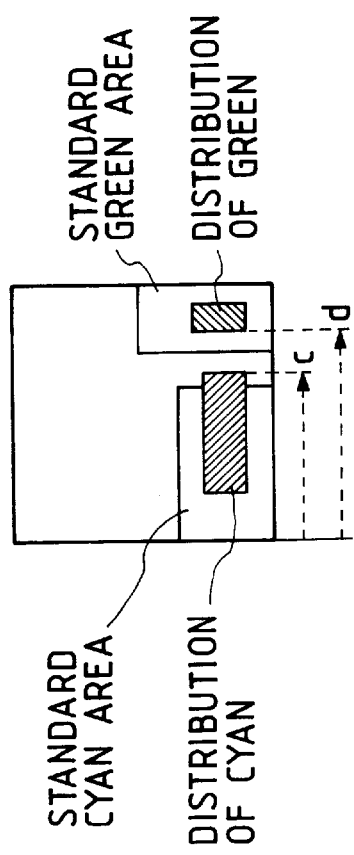

In FIG. 29E, the cyan distribution spreads out of the standard cyan area and the green distribution is within the standard green area. In FIG. 29F, the cyan area and the green area in FIG. 29E are corrected and a boundary Z of the cyan and green is shown. It meets a relation of $$Z=c+(b-c)\div 2$$

Namely, the center between the edge of the cyan distribution and the edge of the standard green area is defined as the boundary Z of the cyan and green.

Figure 29G:
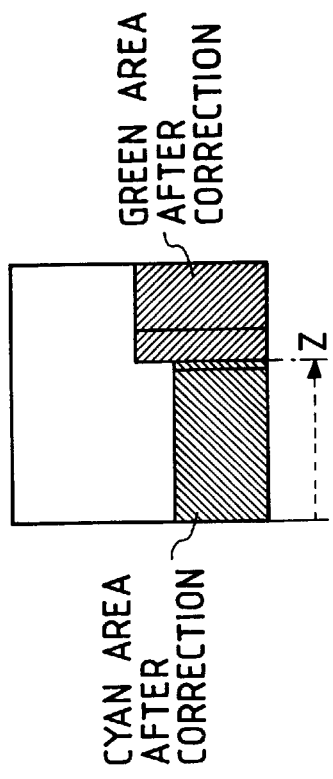
Figure 29H:
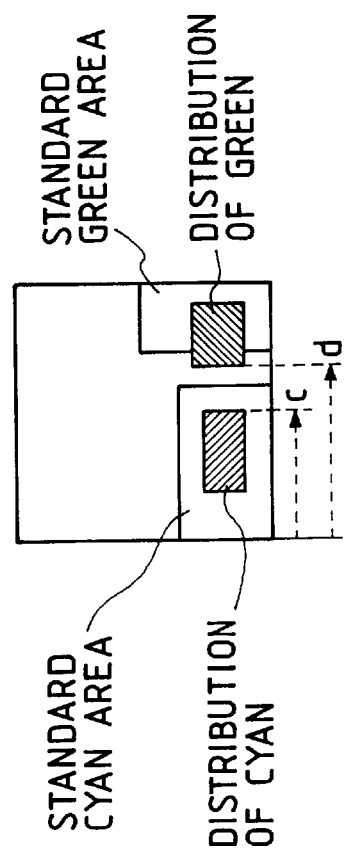

In FIG. 29G, the green distribution spreads out of the standard green area and the cyan distribution is within the standard cyan area. In FIG. 29H, the cyan area and the green area in FIG. 29G are corrected and a boundary Z of the cyan and green is shown. It meets a relation of $$Z=a+(d-a)\div 2$$

Namely, the center between the edge of the green distribution and the edge of the standard cyan area is defined as the boundary Z of the cyan and green.

Figure 30A:
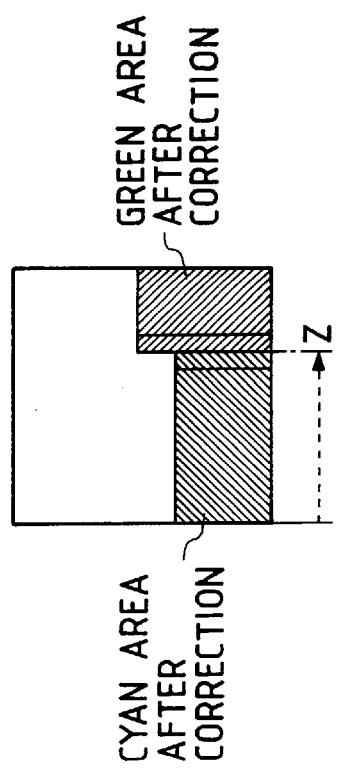
Figure 30B:
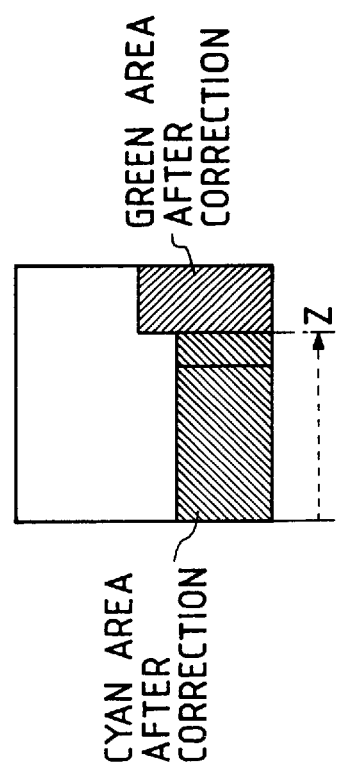

In FIG. 30A, the green distribution and the cyan distribution spread out of the standard green area and the standard cyan area. In FIG. 30B, the cyan area and the green area in FIG. 30A are corrected and a boundary Z of the cyan and green is shown. It meets a relation of $$Z=c+(d-c)\div 2$$

Namely, the center between edge of the green distribution and the edge of the cyan distribution is defined as the boundary Z of the cyan and green.

Figure 30C:
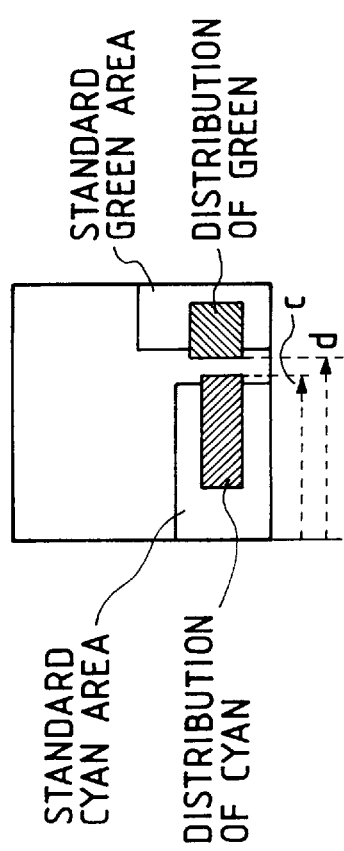
Figure 30D:
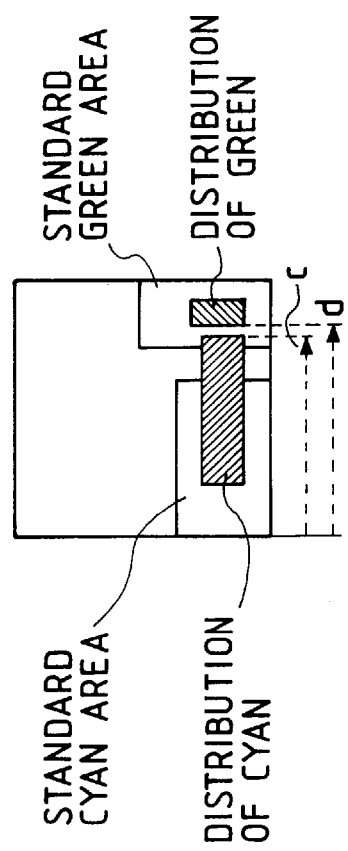

In FIG. 30C, the cyan distribution spreads out of the standard cyan area and into the standard green area, and the green distribution is within the standard green area. In FIG. 30D, the cyan area and the green area in FIG. 30C are corrected and a boundary between the cyan and green is shown. It meets a relation of $$Z=b$$

Namely, the edge of the standard green area is defined as the boundary Z.

In FIG. 30E, the green distribution spreads out of the standard green area and into the standard cyan area, and the cyan distribution is within the standard cyan area. In FIG. 30F, the cyan area and the green area in FIG. 30E are corrected and a boundary Z between the cyan and green is shown. It meets a relation of $$Z=a$$

Namely, the edge of the standard cyan area is defined as the boundary Z.

In FIG. 30G, the green distribution spreads out of the standard green area and into the standard cyan area, and the cyan distribution spreads out of the standard cyan area and into the standard green area. In FIG. 30H, the cyan area and the green area in FIG. 30H are corrected and a boundary Z between the cyan and green is shown. It meets a relation of $$Z=a+(b-a)\div 2$$

Namely, the center between the standard cyan area and the standard magenta area is defined as the boundary Z. In FIGS. 30C, 30E and 30G, since the marker of different color may enter such as green into the standard cyan area or cyan into the standard green area. Thus, the boundary is determined in the manner described above and the possibility of detection of the cyan marker as green is displayed on a liquid crystal display of a console unit (not shown) to bring user's attraction. In FIGS. 29A to 29H and 30A to 30H, the boundary of the primary color C (cyan) and green is determined although the same process may be conducted for the primary color M and the primary color Y to determine the boundaries.

In the second embodiment described above, a first method for optimizing the color determination parameters for determining the color of the marker pen used for the color marking in accordance with a country or region to which the copying apparatus is shipped is explained with reference to FIGS. 31 and 32.

FIG. 31 shows an example of setting of magnification factors in the console unit of the copying apparatus. For Japan, since the sheets of A series and B series are used, a combination of magnification may include A4 to B4, A4 to A3 and B4 to A3. For the U.S., since the sheets of inch-series are used, the combination of magnification may include LTR to LGL. For Europe, since the sheets of A series are used, the combination of magnification may include A4 to A3. Thus, it is seen that even for the magnification setting, the number of combination of magnification, the reduction factors and the magnification factors change from region to region. In the current control method for the magnification of the copying apparatus, separate software for each region is not prepared but software which is common worldwide is prepared and region codes are registered so that the number of combinations of magnification, the reduction factors and the magnification factors are set based on the region code. Namely, the control unit of the presently marketed copying apparatus uses the region codes.

Figure 32:
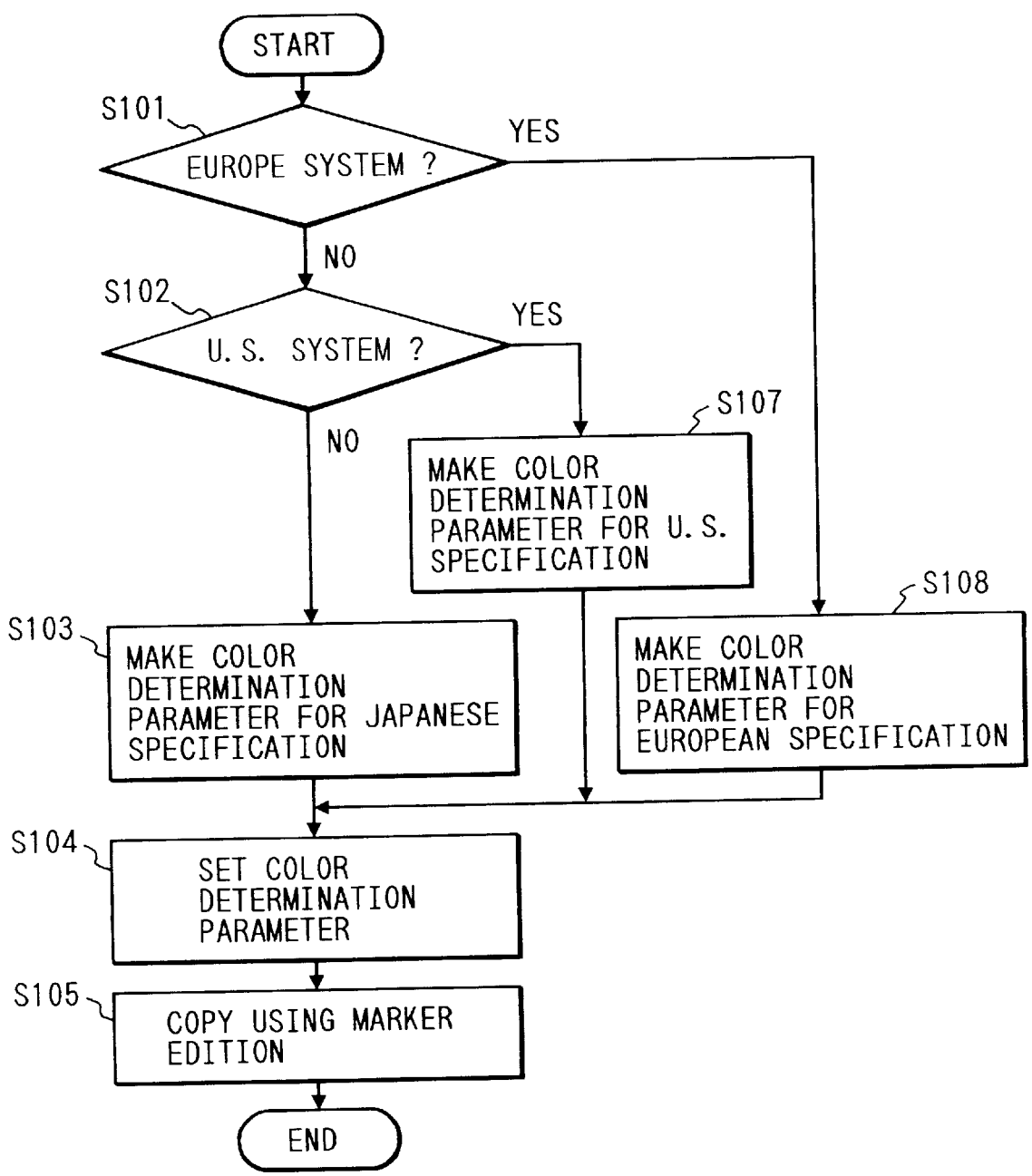
FIG. 32 shows a flow chart of a color determination parameter setting process.

FIG. 32 shows a flow for setting the color determination parameters for the region and show a process after the user of the copying apparatus has selected the marker edition function and depressed the copy button.

In a step S101, whether the region code stored in the copying apparatus is for Europe or not is determined. If it is deterurope, the color determination parameters are set in the Europe specification (step S108). Specifically, the parameters for Europe are read from the preset parameters for determining the colors of the markers painted on the document sheet.

In the step S101, if the region code is not for Europe, whether the region code is for the U.S. or not is determined (step S102). In the present embodiment, the region code is shared by the variable magnification circuit 228 and the marker edition circuit 227 although independent region code may be used for the marker edition circuit 227.

In the step S102, if the region code is for the U.S., the color determination parameters are set in the U.S. specification (step S107), and if the region code is not for the U.S., the color determination parameters are set in the Japan specification (step S103).

After the step S103, S107 or S108 has been executed, the process proceeds to the step S104 to set the color determination parameters, that is, set the color determination area shown in FIG. 12. In the next step S105, the copy operation by the marker edition is conducted. The detailed marker edition copy operation has been described above. After the marker edition copy operation, the copy operation is terminated.

Next, a second method for optimizing the color determination parameters in accordance with the country or region to which the copying apparatus is shipped is explained with reference to FIG. 33A. In this method, the information representing the region is added to the print head.

Figure 33A:
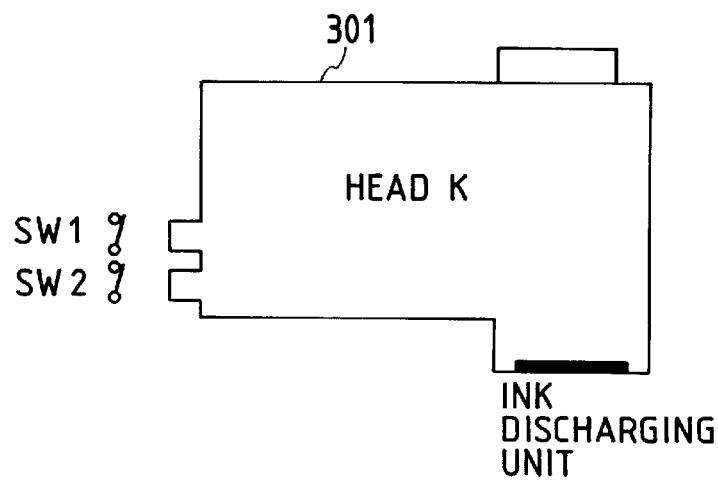
FIGS. 33A and 33B show a print head having area information added thereto.

FIG. 33A shows a construction of a print head L 301. A projection indicating a ship destination is provided at a left end of the print head K and the presence or absence of the projection is detected by switches SW1 and SW2 to determine the ship destination place. For example, when both the switches SW1 and SW2 are off, it indicates Japan, when the switch SW1 is on and the switch SW2 is on, it indicates the U.S., when the switch SW1 is off and the switch SW2 is on, it indicates the Europe, and when both the switches SW1 and SW2 are on, it indicates other region, and the color determination parameters are set accordingly.

By adding the information representing the ship destination place to the print head in this manner, the copying apparatus may be used commonly worldwide for the marker processing.

Figure 33B:
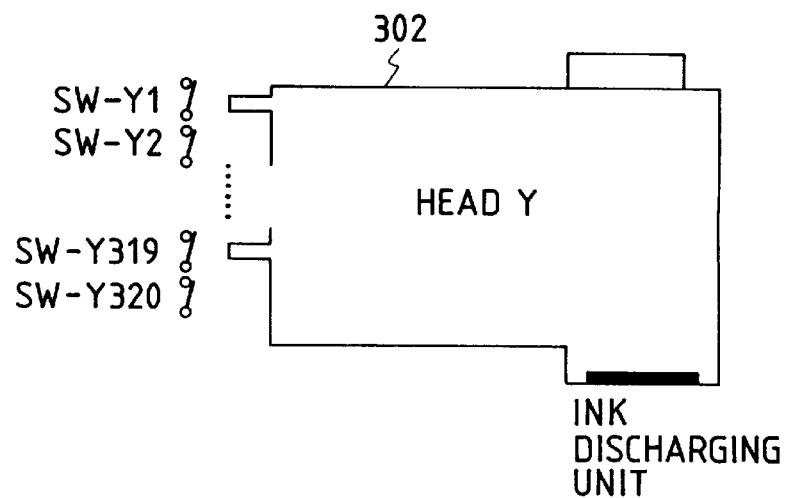
Figure 34A:
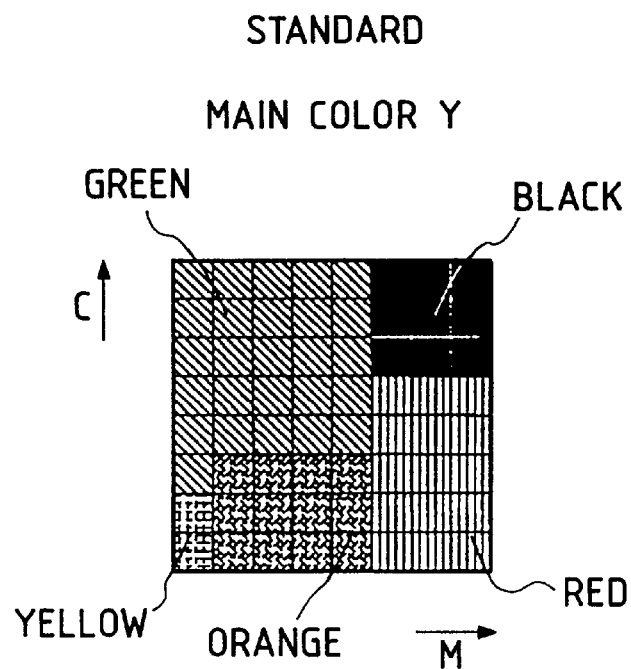
FIGS. 34A and 34B show an example of modification of the color determination parameter in accordance with the area information.

A third method for optimizing the color determination parameters in accordance with the country or region to which the copying apparatus is shipped is explained with reference to FIGS. 33B, 34A and 34B. In this method, the information representing the region is added to the print head as it is in the second method.

FIG. 33A shows a construction of a print head Y 302. A projection to indicate the color determination parameter when the marker color is the primary color of Y is provided at a left end of the print head Y and the presence and absence of the projection is detected by switches SW-Y1 to SW-Y320 so that the color determination parameters for the region are set. FIG. 34A shows the standard parameters for the primary color of Y. When Y is the primary color, five colors, yellow, orange, red, green and black are possible in the standard state. When Y is the primary color, one of the five colors is selected for one area (one block in FIGS. 34A and 34B).

Thus, the switches SW-Y1 to SW-Y5 are assigned to one area and the determination color of the area is determined based on which ones of SW-Y1 to SW-Y5 are on, and the color corresponding to the on-state SW is set. In the present embodiment, since there are 64 (8×8) areas for one primary color, 320 (64×5) SW's and 64 projections to designate the determination colors are required. It is also required to adjust the positions of the projections for each region. Thus, in an actual copying apparatus, a non-volatile memory is mounted on the head and the color determination parameters are stored in the non-volatile memory and the color determination parameters are read from the non-volatile memory of the head when the copying apparatus is powered on to set the color determination parameters.

Figure 34B:
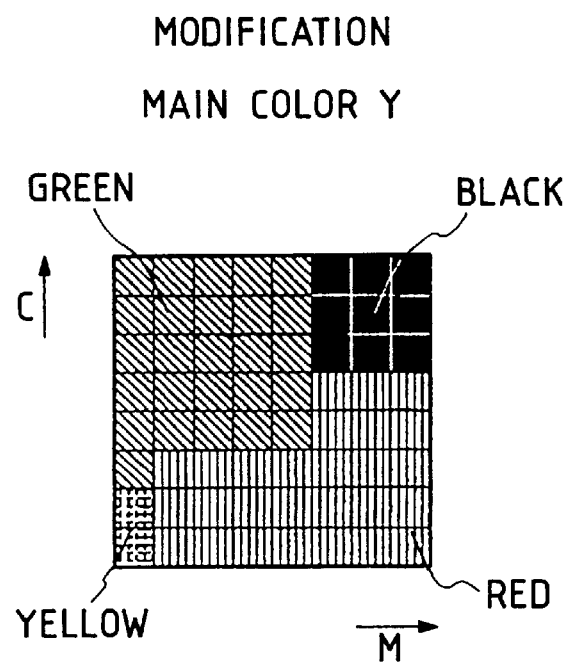

FIG. 34B shows an example of the color determination parameters for one region set in the third method. In that region, the orange marker pen is not used but red which is close to orange (which is recognized as red in that region) is frequently used. Accordingly, the determination area for orange color is defined as red color to prevent misdetermination of red as orange.

As a result, the number of discriminable marker colors is limited to seven rather than the standard eight colors so that the misdetermination of the marker color is suppressed.

While the primary color of Y has been described above, the same process may be applied to the primary color of C and the primary color of M.

When the third method is used, it is preferable that the color of the ink accommodated in the print head and the primary color of the color determination parameters are same.

A fourth method for optimizing the color determination parameters in accordance with the country or region to which the copying apparatus is shipped is explained with reference to FIGS. 35 and 36. In this method, the region is determined based on the characteristic of the AC power line and the color determination parameters are set in accordance with the resulting region information.

Figure 35:
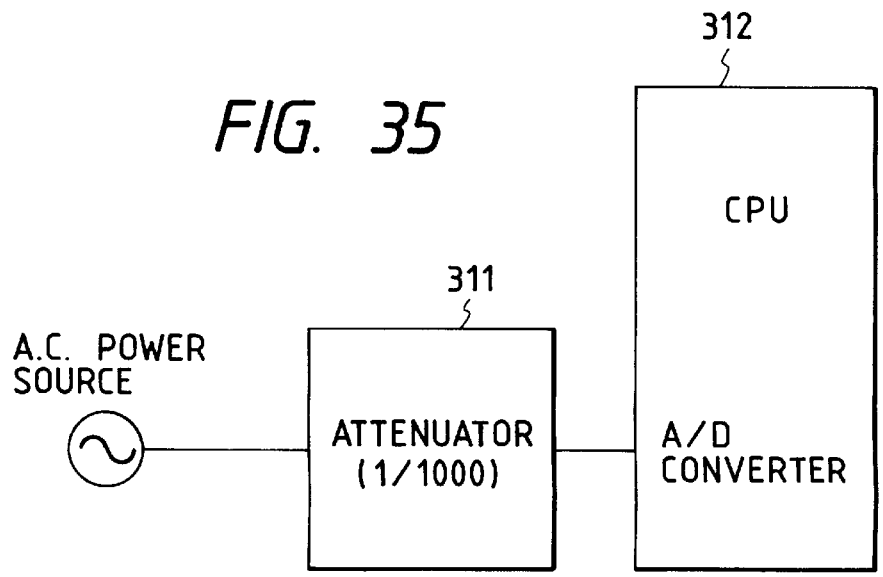
FIG. 35 shows a configuration for measuring an AC power supply and a characteristic.

FIG. 35 shows a block diagram of a configuration to determine the characteristic of the AC power line. For the AC power line, voltages of 100 volts to 240 volts and frequencies of 50 Hz and 60 Hz are subject of test. In FIG. 35, the AC power line is applied to an attenuator 311 which attenuates the voltage to $\frac{1}{1000}$ which is applied to an AD converter of a CPU 312. The signal applied to the AD converter is processed in accordance with a flow of FIG. 36.

Figure 36:
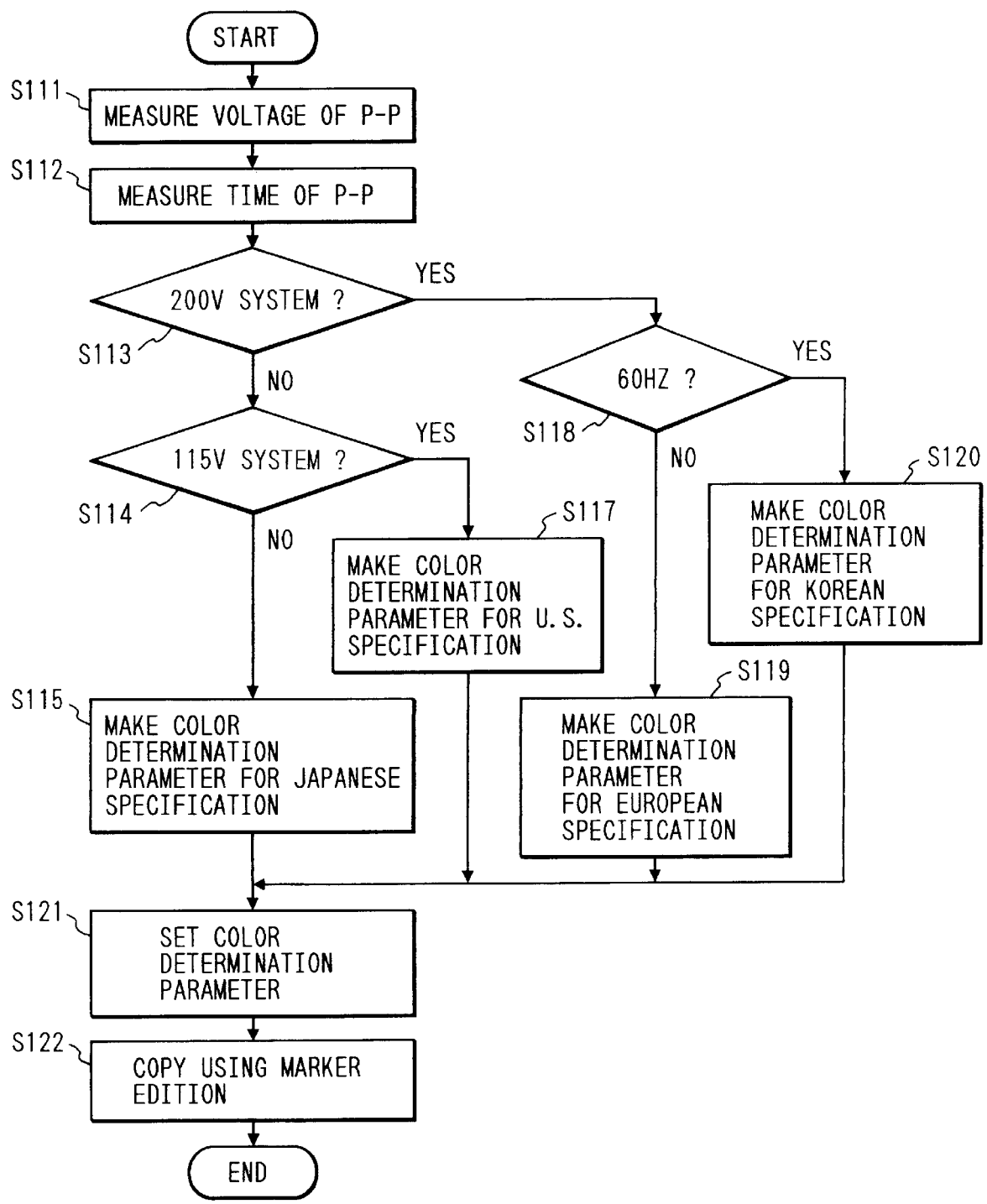
FIG. 36 shows a flow chart of a process for determining a sales area in accordance with the characteristic of the AC power supply.
Figure 37A:
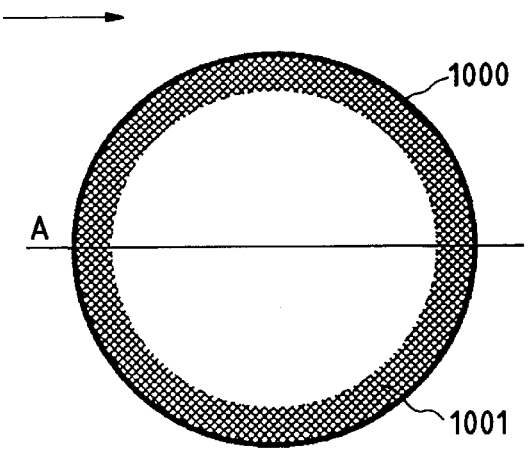
FIGS. 37A and 37B illustrate marker edition.
Figure 37B:
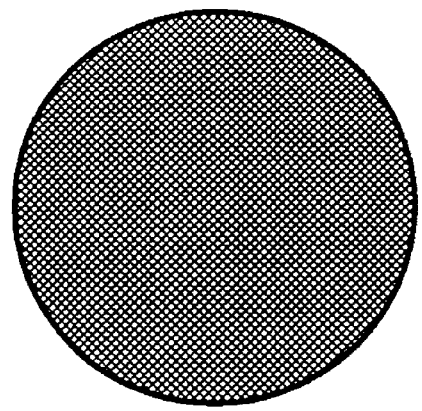
Figure 38A:
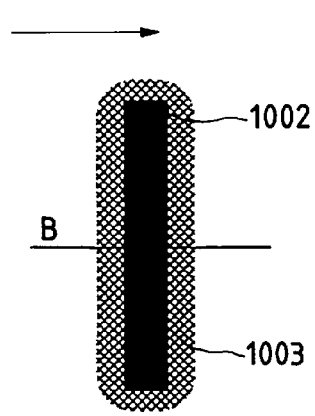
FIGS. 38A and 38B illustrate marker edition.
Figure 38B:
Figure 39A:
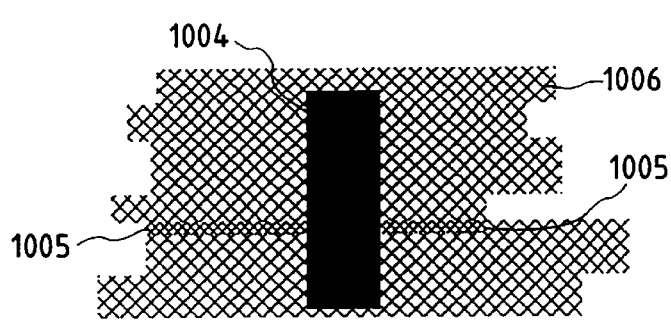
FIGS. 39A and 39B illustrate problems in prior art marker edition.
Figure 39B:

FIG. 36 shows a flow of the determination of the region in which the copying apparatus is used based on the characteristic of the AC power line.

In a step S111, a minimum value of the voltage is subtracted from a maximum value and a time from the maximum to the minimum of the voltage is measured (step S112). In the next step S113, whether the voltage of the AC power line is 200 volts system or not is determined. Namely, a peak of the voltage derived in the step S111 is multiplied by a reciprocal of an attenuation factor of the attenuator 311 and if the resulting product is not lower than 500 volts, the power line is determined to be 200 volts system and the process proceeds to a step S118. If the resulting product is lower than 500 volts, the power line is determined not to be 200 volts system and the process proceeds to a step S114.

In the step S114, whether the AC power line is 115 volts system or not is determined. Namely, the peak value of the voltage derived in the step S111 is multiplied by the reciprocal of the attenuation factor of the attenuator 311 and if the resulting product is not lower than 300 volts, the power line is determined to be 115 volts system and the color determination parameters are set in the U.S. specification (step S117). If the resulting product is lower than 300 volts, the power line is determined not to be 200 volts system and the color determination parameters are set in the Japan specification (step S115). Specifically, the Japan parameters are read from the preset parameters for determining the marker colors painted on the document sheet.

In a step S118, whether the frequency of the AC power line is 50 Hz or 60 Hz is determined. Namely, the time from the maximum to the minimum of the voltage measured in the step S112 is doubled to determine one period time, and a reciprocal of the one period time is calculated to determine the frequency of the AC power line. If the frequency of the AC power line is lower than 55 Hz, the power line is determined to be 50 Hz system and the color determination parameters are set in Korea specification (step S119). If the frequency of the AC power line is higher than 50 Hz, the power line is determined to be 60 Hz system and the color determination parameters are set in the Europe specification (step S119).

After the step S115, S117, S119 or S120 has been executed, steps S121 and S122 are executed to conduct the same process as that of the steps S104 and S105 and then the process is terminated.

In the fourth method, even if the information on the destination place is not added, the region of use may be determined and the correct color determination parameters may be set.

What is claimed is:

1. An image processing apparatus comprising:
   read means for reading a document sheet which is marked by a marker pen;

registration means for registering a marker color in accordance with plural separate patches marked by the user with different amounts of overpainting so that the plurality of patches are all treated as the same color when the marker color is registered;

determination means for determining the marker color on the document sheet read by said read means, based on the marker color registered by said registration means; and process means for processing an image of the document in accordance with the marker color determined by said determination means.

2. An image processing apparatus according to claim 1, further comprising paint means for coloring inside of an entire closed section defined by a black line on the image of the document for said process means to process.

3. An image processing apparatus according to claim 1, further comprising convert means for converting a black line to a colored line on the image of the document for said process means to process.

4. An image processing method comprising the steps of:

reading a document sheet which is marked by a marker pen;

registering a marker color in accordance with plural separate patches marked by the user with different amounts of overpainting so that the plurality of patches are all treated as the same color when the marker color is registered;

determining the marker color on the document sheet read in said reading step, based on the marker color registered in said registration step; and processing an image of the document in accordance with the marker color determined in said determining step.

5. An image processing method according to claim 4, further comprising a painting step for coloring inside of an entire closed section defined by a black line on the image of the document.

6. An image processing method according to claim 4, further comprising a converting step for converting a black line to a colored line on the image of the document.

7. An image processing apparatus comprising:

read means for reading a document sheet which is marked by a marker pen;

registration means for registering a marker color in accordance with plural separate patches marked by the user with different amounts of overpainting so that the plurality of patches are all treated as the same color when the marker color is registered;

detecting means for detecting a mark of the marker pen on the document sheet read by said read means, based on the marker color registered by said registration means; and process means for processing an image of the document in accordance with the mark detected by said detection means.

8. An image processing apparatus according to claim 7, further comprising paint means for coloring inside of an entire closed section defined by a black line on the image of the document for said process means to process.

9. An image processing apparatus according to claim 7, further comprising convert means for converting a black line to a colored line on the image of the document for said process means to process.

10. An image processing method comprising the steps of:

reading a document sheet which is marked by a marker pen;

registering a marker color in accordance with plural separate patches marked by the user with different amounts of overpainting so that the plurality of patches are all treated as the same color when the marker color is registered;

detecting a mark of the marker pen on the document sheet read in said reading step, based on the marker color registered in said registration step; and processing an image of the document in accordance with the mark detected in said detection step.

11. An image processing method according to claim 10, further comprising a painting step for coloring inside of an entire closed section defined by a black line on the image of the document.

12. An image processing apparatus comprising:

read means for reading a document sheet which is marked by a marker pen;

registration means for registering a marker color in accordance with plural separate patches marked by the user with different shades of the same color so that the plurality of patches are all treated as the same color when the marker color is registered;

determination means for determining the marker color on the document sheet read by said read means, based on the marker color registered by said registration means; and process means for processing an image of the document in accordance with the marker color determined by said determination means.

13. An image processing apparatus according to claim 12, wherein the plurality of patches marked with different shades of the same color are marked with different numbers of times of over painting of a color, which are registered as one marker color.

14. An image processing apparatus comprising:

read means for reading a document sheet which is marked by a marker pen;

set means for setting color determination parameters in accordance with plural separate patches marked by the user with different shades of the same color so that the plurality of patches are all treated as the same color when the marker color is registered;

determination means for determining a marker color on the document sheet read by said read means, based on the color determination parameters set by said set means; and process means for processing an image of a document in accordance with the marker color determined by said determination means.

15. An image processing apparatus according to claim 14, wherein said set means sets the color determination parameters based on the plurality of patches marked on respective predetermined areas on the document sheet read by said read means.

16. An image processing apparatus according to claim 14, wherein said set means includes memory means for storing present standard color determination parameters, and said set means sets the color determination parameters by correcting the standard color determination parameters based on the plurality of patches marked on the document sheet.

17. An image processing apparatus comprising:

read means for reading a document sheet which is marked by a marker pen;

geographic region determination means for determining a geographic region where the marker pen originates;

marker color determination means for determining the marker color on the document sheet read by said read means, based on a geographic region determined by said geographic region determination means; and process means for processing an image of the document in accordance with the marker color determined by said marker color determination means.

18. An image processing apparatus according to claim 17, wherein said geographic region determination means determines the region where the marker pen originates based on a magnification setting of said apparatus.

19. An image processing apparatus according to claim 17, wherein said geographic region determination means determines the region where the marker pen originates based on region information added to a print head of said apparatus.

20. An image processing apparatus according to claim 17, wherein said geographic region determination means determines the region where the marker pen originates based on a characteristic of an AC power supply supplied to said apparatus.

21. An image processing apparatus according to claim 17, further comprising parameter memory means for storing color determination parameters, wherein said determination means determines the marker color by using the color determination parameters stored in said parameter memory means.

22. An image processing apparatus according to claim 21, wherein the color of the ink accommodated in a print head of said apparatus is the same as a primary color of the color determination parameters.

23. An image processing apparatus according to claim 21, wherein said parameter memory means is mounted on a print head of said apparatus.

24. An image processing apparatus according to claim 12, wherein said registration means registers the marker color based on the plurality of patches marked on respective predetermined areas on the document sheet read by said read means.

25. An image processing apparatus comprising:

read means for reading a document sheet which is marked by a marker pen;

registration means for registering a marker color in accordance with plural separate patches marked by the user with different shades of the same color so that the plural patches are all treated as the same color when the marker color is registered;

detecting means for detecting a mark of the marker pen on the document sheet read by said read means, based on the marker color registered by said registration means; and process means for processing an image of the document in accordance with mark detected by said detecting means.

26. An image processing apparatus comprising:

read means for reading a document sheet which is marked by a marker pen;

geographic region determination means for determining a geographic region where the marker pen originates;

detecting means for detecting a mark of the marker pen on the document sheet read by said read means, based on a geographic region determined by said geographic region determination means; and process means for processing an image of the document in accordance with the mark detected by said detecting means.

27. An image processing apparatus according to claim 25, wherein said registration means registers the marker based on the plurality of patches marked on respective predetermined areas on the document sheet read by said read means.

28. An image processing apparatus according to claim 12, further comprising paint means for coloring inside of an entire closed section defined by a black line on the image of the document for said process means to process.

29. An image processing apparatus according to claim 14, further comprising convert means for converting a black line to a colored line on the image of the document for said process means to process.

30. An image processing apparatus according to claim 25, wherein the plurality of patches marked with different shades of the same color are marked with different numbers of times of overpainting of a color, which are registered as one marker color.

31. An image processing apparatus according to claim 26, wherein said geographic region determination means determines the region where the marker pen originates based on a magnification setting of said apparatus.

32. An image processing apparatus according to claim 26, wherein said geographic region determination means determines the region where the marker pen originates based on region information added to a print head of said apparatus.

33. An image processing apparatus according to claim 26, wherein said geographic region determination means determines the region where the marker pen originates based on a characteristic of an AC power supply supplied to said apparatus.

34. An image processing apparatus according to claim 14, further comprising paint means for coloring inside of an entire closed section defined by a black line on the image of the document for said process means to process.

35. An image processing apparatus according to claim 14, further comprising convert means for converting a black line to a colored line on the image of the document for said process means to process.

36. An image processing apparatus according to claim 17, further comprising paint means for coloring inside of an entire closed section defined by a black line on the image of the document for said process means to process.

37. An image processing apparatus according to claim 17, further comprising convert means for converting a black line to a colored line on the image of the document for said process means to process.

38. An image processing apparatus according to claim 25, further comprising paint means for coloring inside of an entire closed section defined by a black line on the image of the document for said process means to process.

39. An image processing apparatus according to claim 25, further comprising convert means for converting a black line to a colored line on the image of the document for said process means to process.

40. An image processing apparatus according to claim 26, further comprising paint means for coloring inside of an entire closed section defined by a black line on the image of the document for said process means to process.

41. An image processing apparatus according to claim 26, further comprising convert means for converting a black line to a colored line on the image of the document for said process means to process.

42. An image processing method comprising the steps of:

reading a document sheet which is marked by a marker pen;

registering a marker color in accordance with plural separate patches marked by the user with different shades of the same color so that the plurality of patches are all treated as the same color when the marker color is registered;

determining the marker color on the document sheet read in said reading step, based on the marker color registered in said registration step; and processing an image of the document in accordance with the marker color determined in said determination step.

43. An image processing method according to claim 42, wherein the plurality of patches marked with different shades of the same color are marked with different numbers of times of overpainting of a color, which, in said registration step, are registered as one marker color.

44. An image processing method comprising the steps of:
reading a document sheet which is marked by a marker pen;

setting color determination parameters in accordance with plural separate patches marked by the user with different shades of the same color so that the plurality of patches are all treated as the same color when the marker color is registered;

determining a marker color on the document sheet read in said reading step, based on the color determination parameters set in said setting step; and processing an image of a document in accordance with the marker color determined in said determination step.

45. An image processing method according to claim 44, wherein in said setting step the color determination parameters are set based on the plurality of patches marked on respective predetermined areas on the document sheet read in said reading step.

46. An image processing method according to claim 44, wherein in said setting step preset standard color determination parameters are stored, and the color determination parameters are set by correcting the standard color determination parameters based on the plurality of patches marked on the document sheet.

47. An image processing method comprising the steps of:
reading a document sheet which is marked by a marker pen;

determining a geographic region where the marker pen originates;

determining the marker color on the document sheet read in said reading step, based on a geographic region determined by said geographic region determination step; and processing an image of the document in accordance with the marker color determined in said marker color determination step.

48. An image processing method according to claim 47, wherein in said geographic region determination step the region where the marker pen originates is determined based on a magnification setting of an image processing apparatus in which said method is used.

49. An image processing method according to claim 47, wherein in said geographic region determination step the region where the marker pen originates is determined based on region information added to a print head of an image processing apparatus in which said method is used.

50. An image processing method according to claim 47, wherein in said geographic region determination step the region where the marker pen originates is determined based on a characteristic of an AC power supply supplied to an image processing apparatus in which said method is used.

51. An image processing method according to claim 47, further comprising a storing step for storing color determination parameters, wherein in said marker color determination step the marker color is determined by using the stored color determination parameters.

52. An image processing method according to claim 51, wherein in said storing step, information is stored in a memory mounted on a print head of an image forming apparatus in which said method is used.

53. An image processing method according to claim 42, wherein in said registration step the marker color is registered based on the plurality of patches marked on respective predetermined areas on the document sheet read in said reading step.

54. An image processing method comprising the steps of:
reading a document sheet which is marked by a marker pen;

registering a marker color in accordance with plural separate patches marked by the user with different shades of the same color so that the plural patches are all treated as the same color when the marker color is registered;

detecting a mark of the marker pen on the document sheet read by said reading step, based on the marker color registered in said registration step; and processing an image of the document in accordance with the mark detected in said detecting step.

55. An image processing method comprising the steps of:
reading a document sheet which is marked by a marker pen;

determining a geographic region where the marker pen originates;

detecting a mark of the marker pen on the document sheet read by said reading step, based on a geographic region determined by said marker color determination step; and processing an image of the document in accordance with the mark detected in said detecting step.

56. An image processing method according to claim 54, wherein said registration step registers the marker based on the plurality of patches marked on respective predetermined areas on the document sheet read in said reading step.

57. An image processing method according to claim 42, further comprising a painting step for coloring inside of an entire closed section defined by a black line on the image of the document.

58. An image processing method according to claim 42, further comprising a converting step for converting a black line to a colored line on the image of the document.

59. An image processing method according to claim 54, wherein the plurality of patches marked with different shades of the same color are marked with different numbers of times of overpainting of a color, which, in said registration step, are registered as one marker color.

60. An image processing method according to claim 55, wherein in said geographic region determination step the region where the marker pen originates is determined based on a magnification setting of an image forming apparatus in which said method is used.

61. An image processing method according to claim 55, wherein said geographic region determination step determines the region where the marker pen originates based on region information added to a print head of an image forming apparatus in which said method is used.

62. An image processing method according to claim 55, wherein said geographic region determination step determines the region where the marker pen originates based on a characteristic of an AC power supply supplied to an image forming apparatus in which said method is used.

63. An image processing method according to claim 44, further comprising a painting step for coloring inside of an entire closed section defined by a black line on the image of the document.

64. An image processing method according to claim 44, further comprising a converting step for converting a black line to a colored line on the image of the document.

65. An image processing method according to claim 47, further comprising a painting step for coloring inside of an entire closed section defined by a black line on the image of the documents.

66. An image processing method according to claim 47, further comprising a converting step for converting a black line to a colored line on the image of the document.

67. An image processing method according to claim 54, further comprising a painting step for coloring inside of an entire closed section defined by a black line on the image of the document.

68. An image processing method according to claim 54, further comprising a converting step for converting a black line to a colored line on the image of the document.

69. An image processing method according to claim 55, further comprising a painting step for coloring inside of an entire closed section defined by a black line on the image of the document.

70. An image processing method according to claim 55, further comprising a converting step for converting a black line to a colored line on the image of the document.

71. An image processing apparatus according to claim 17, wherein said geographic region determination means determines from which one of a plurality of geographic regions the marker pen originates, and wherein said marker color determination means stores information for each of the plurality of geographic regions and determines the marker color in accordance with the information corresponding to the geographic region determined by said region determination means.

72. An image processing method according to claim 10, further comprising a converting step for converting a black line to a colored line on the image of the document.

* * * * *

UNITED STATES PATENT AND TRADEMARK OFFICE
CERTIFICATE OF CORRECTION

PATENT NO. : 5,974,171

DATED : October 26, 1999

INVENTORS : Toshio Hayashi, et al.

It is certified that error appears in the above-identified patent and that said Letters Patent is hereby corrected as shown below:

COLUMN 18

Line 3, after "boundary Z.", begin a new paragraph with "In"; and

Line 44, "deterurope" should read -- for Europe --

COLUMN 22

Line 34, "over painting" should read --overpainting--.

Signed and Sealed this

Fifteenth Day of August, 2000

Attest:

Q. TODD DICKINSON

*Attesting Officer*  *Director of Patents and Trademarks*